(12) United States Patent
Bober et al.

(10) Patent No.: US 11,469,615 B2
(45) Date of Patent: Oct. 11, 2022

(54) DEVICE FOR WIRELESS CHARGING OF AT LEAST ONE PORTABLE ELECTRONIC DEVICE CAPABLE OF BEING FIXED TO A PORTION OF FURNITURE

(71) Applicant: WBTEC, LLC, Sarasota, FL (US)

(72) Inventors: Wieslaw Bober, Hopewell Junction, NY (US); Kamil Sienkiel, Wegrzce (PL); Dominik Stanislaw Sienkiel, Ostrowiec Swietokrzyski (PL)

(73) Assignee: WBTEC, LLC, Sarasota, FL (US)

( * ) Notice: Subject to any disclaimer, the term of this patent is extended or adjusted under 35 U.S.C. 154(b) by 0 days.

(21) Appl. No.: 17/559,392

(22) Filed: Dec. 22, 2021

(65) Prior Publication Data
US 2022/0115907 A1    Apr. 14, 2022

Related U.S. Application Data

(63) Continuation-in-part of application No. 16/681,487, filed on Nov. 12, 2019, now Pat. No. 11,374,417.
(Continued)

(30) Foreign Application Priority Data

Dec. 22, 2020 (PL) ........................................ 436458

(51) Int. Cl.
*H01M 10/46* (2006.01)
*H02J 50/00* (2016.01)
(Continued)

(52) U.S. Cl.
CPC .......... *H02J 50/005* (2020.01); *A47C 21/003* (2013.01); *H02J 7/0042* (2013.01);
(Continued)

(58) Field of Classification Search
CPC ........ H02J 7/0042; H02J 50/005; H02J 50/10; H02J 2310/22; H02J 2207/30; A47C 7/72; A47C 7/624; A47C 21/003
(Continued)

(56) References Cited

U.S. PATENT DOCUMENTS

2009/0295327 A1   12/2009  McGinley
2015/0244182 A1*  8/2015   Ozana ................... H01F 27/366
                                                        307/104
(Continued)

FOREIGN PATENT DOCUMENTS

CN    105393317 A  *  3/2016  .............. H02J 50/10
KR    20110091616 A *  12/2011  ............ H02J 7/0044

*Primary Examiner* — Edward Tso
(74) *Attorney, Agent, or Firm* — The Farrell Law Firm, P.C.

(57) ABSTRACT

A device for wireless charging of portable electronic devices is provided. The device is capable of being fixed to a piece of furniture and includes a charger configured to transmit electricity via induction; a horizontal arm of an angular shelf beneath which the charger is mounted; and an angular bracket configured to mount the device to the piece of furniture by adjusting a spacing between a vertical arm of the angular bracket and a vertical arm of the angular shelf to approximately a width of the piece of furniture, wherein the charger is mounted between the angular bracket and the angular shelf, and wherein the angular bracket is slidably mounted in relation to the vertical arm of the angular shelf.

20 Claims, 20 Drawing Sheets

Related U.S. Application Data

(60) Provisional application No. 62/758,239, filed on Nov. 9, 2018.

(51) Int. Cl.
  *H02J 7/00* (2006.01)
  *A47C 21/00* (2006.01)
  *H02J 50/10* (2016.01)

(52) U.S. Cl.
  CPC ........... *H02J 50/10* (2016.02); *H02J 2207/30* (2020.01); *H02J 2310/22* (2020.01)

(58) Field of Classification Search
  USPC ................................ 320/107, 108, 114, 115
  See application file for complete search history.

(56) References Cited

U.S. PATENT DOCUMENTS

| | | |
|---|---|---|
| 2017/0149181 A1 | 5/2017 | Nelson |
| 2017/0356218 A1* | 12/2017 | Beasley .................. G07C 9/35 |
| 2018/0138683 A1* | 5/2018 | Girdzis ..................... H02J 7/00 |
| 2018/0191178 A1 | 7/2018 | Byrne |
| 2019/0305577 A1 | 10/2019 | Yi |

\* cited by examiner

A-A

DEVICE FOR WIRELESS CHARGING OF AT LEAST ONE PORTABLE ELECTRONIC DEVICE CAPABLE OF BEING FIXED TO A PORTION OF FURNITURE

PRIORITY

This application claims priority under 35 U.S.C. § 119 to Polish Patent Application No. 436,458, filed in the Polish Patent Office on Dec. 22, 2020, and is a Continuation in Part application of U.S. application Ser. No. 16/681,487, filed in the U.S. Patent and Trademark Office on Nov. 12, 2019, which claims priority under 35 U.S.C. § 119 to Provisional Application No. 62/758,239 filed in the U.S. Patent and Trademark Office on Nov. 9, 2018, the entire content of each of which are incorporated herein by reference in their entireties.

BACKGROUND OF THE DISCLOSURE

1. Field of the Disclosure

The present disclosure relates generally to charging electronic devices.

2. Description of the Related Art

Due to the increasing use of electronic devices (i.e., mobile phones, tablets, and personal computers (PCs)), more and more charging locations are needed. Recently, many electronic devices are capable of wired or wireless charging, however, convenient charging locations may not exist.

Users of electronic devices frequently use their electronic devices while sitting on or around furniture (i.e., sofas). Thus, there is a need for charging locations to be situated on or around furniture, and not simply at a desk or table.

Therefore, there is a need to place a charger on a piece of furniture that can be characterized by a various forms or different sizes. If the user is not interested in equipping a piece of furniture (itself) with a charger built into it, it may be necessary to use a portable furniture device.

Traditionally, chargers may be plugged into wall outlets, however the charging locations are limited by the length of the charging cable extending out from the wall outlet.

Thus, there is a need to manufacture portable furniture accessories capable of charging electronic devices. Further, it may be necessary to construct the furniture such that an entire furniture item does not necessarily need to be replaced if a charger embedded therein becomes defective.

SUMMARY

The present disclosure has been made to address the above-mentioned problems and disadvantages, and to provide at least the advantages described below.

According to an aspect of the disclosure, a device for wireless charging of at least one external device is provided. The device is capable of being fixed to a piece of furniture and includes a charger configured to transmit electricity via induction; a horizontal arm of an angular shelf beneath which the charger is mounted; and an angular bracket configured to mount the device to the piece of furniture by adjusting a spacing between a vertical arm of the angular bracket and a vertical arm of the angular shelf to approximately a width of the piece of furniture, wherein the charger is mounted between the angular bracket and the angular shelf, and wherein the angular bracket is slidably mounted in relation to the vertical arm of the angular shelf.

According to another aspect of the disclosure, a device for wireless charging at least one external device is provided. The device is capable of being fixed to a piece of furniture and includes a charger configured to transmit electricity via induction; and a horizontal arm of an angular shelf beneath which the charger is mounted, wherein the angular shelf includes a locator system configured to automatically adjust a position of the charger in relation to one or more devices that receive electricity.

According to another aspect of the disclosure, a device for wireless charging at least one external device is provided. The device is capable of being fixed to a piece of furniture and includes a charger configured to transmit electricity via induction; a universal serial bus (USB) port configured to transmit electricity via a wire; a horizontal arm of an angular shelf beneath which the charger is centrally mounted and the USB port is laterally mounted; an angular bracket configured to mount the device to the piece of furniture by adjusting a spacing in between a vertical arm of the angular bracket and a vertical arm of the angular shelf to approximately a width of the piece of furniture; and a rechargeable battery configured to provide power to the charger and the USB port, wherein the charger is mounted between the angular bracket and the angular shelf, and wherein the angular bracket is slidably mounted in relation to the vertical arm of the angular shelf.

BRIEF DESCRIPTION OF THE DRAWINGS

Aspects, features and advantages of the present disclosure will become more apparent from the following detailed description when taken in conjunction with the accompanying drawings in which.

DETAILED DESCRIPTION

Figure 1:
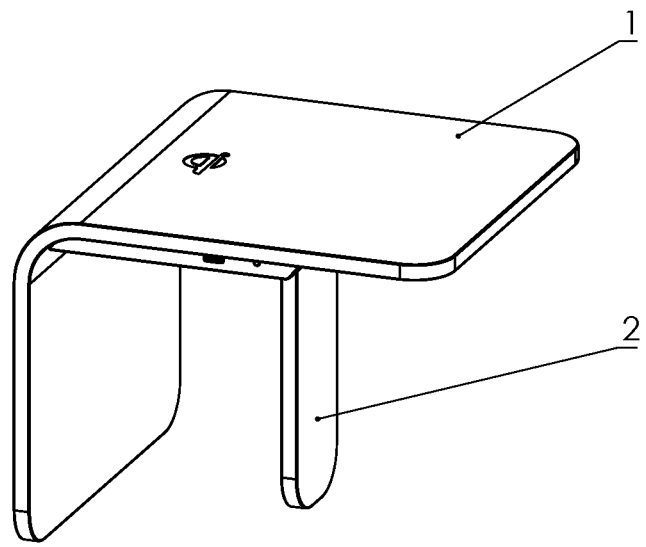
FIG. 1 shows a diagram illustrating a top perspective view of a charging device with a manual adjustment feature, according to an embodiment of the present disclosure.

The present disclosure is directed to providing a charging device for an electronic device and is described in detail with reference to the accompanying drawings. Detailed descriptions of constructions or processes known in the art may be omitted to avoid obscuring the subject matter of the present disclosure.

The descriptions of similar elements are omitted when those elements have already been described with respect to a previous figure.

The present disclosure provides a wired or wireless charging device to connect to or be a part of pieces of furniture characterized by various widths or thicknesses. Such a charging device may be detachably connected to an armrest, sofa, side rail of a chair or other part of an article of furniture, while maintaining a rigid and secure connection with a piece of furniture, enabling the possibility of easy disassembly of the wired or wireless charging device. The charging device may be mounted to the piece of furniture and dismantled using a clamp with a spacing adjusted to the width of a portion of the piece of furniture. The clamp may be a load-bearing element of the whole device.

Accordingly, the present disclosure provides a charging device for wireless charging of portable electronic devices, in particular phones and other mobile devices, and may be attached to a piece of furniture, such as a sofa or a chair. The charging device may include a charger that transmits electricity via induction, powered from the mains through a socket located on the wall and cables led from the socket to the charger's location. These cables may be detachable via electrical connectors, to be described later. Alternatively, the charging device may include a battery so that no wires are necessary for obtaining power. Moreover, the charging device may have a desktop, in which the charger is embedded.

Moreover, a particularly advantageous feature of the charging device is that it may have a bracket so that it can be mounted to a piece of furniture and disassembled with the possibility of adjusting its spacing to the width or thickness of a piece of furniture. This element includes a fixed angular shelf with a horizontal base, under which an adjustable angular bracket is placed. A charger is located between the horizontal base and the horizontal arm of the bracket. The support is mounted slidingly in relation to the angular shelf. It is equipped with one or more displacement and positioning locks.

The shelf may be an angular section of the charging device. One arm of this angular section may be the base of the shelf, in a horizontally located mounting position, and the second shelf arm may be a support, in a vertically located mounting position adjacent to the first vertical side wall of the armrest in a piece of furniture or another vertical wall of a piece of furniture. Under the shelf (under its horizontal base), a bracket may be included, which enables a sliding adjustment and provides pressure. The bracket may also be provided in the angular section. One arm of the bracket in the fastened position may rest horizontally against a lower horizontal surface of the shelf's base. A second arm of the bracket in the fastened position may extend vertically and adjacent to the second vertical side wall of the armrest.

The device may be adjusted by manual pressure. The set position of the adjustable support may be locked by tightening the locking screw. The locking element may be screwed from the bottom into the socket (into the horizontal based of the shelf) and pass through a longitudinal slot made in the horizontal arm of the support.

The set position of the adjustable support may be locked by a single-acting ratchet mechanism located between the horizontal arm of the support and the shelf's horizontal base. The bracket may be attached to the horizontal base using sliding pins in slots of the bracket's horizontal arm. The toothed locking bar may be embedded in the recess (at the bottom) of the horizontal base of the shelf. The latch may be embedded in a longitudinal through hole of the adjustable horizontal arm of the bracket. The latch may be made of a resilient material and have a pressure zone used to unlock it.

The device can also be adjusted via a mechanical pressure by moving the adjustable bracket and locking of the set position using a motor. The motor may be connected through a gear with a bolt cooperating with a nut. The nut may be attached to a lower surface of the shelf's horizontal base. The other end of the bolt may be embedded in the yoke attached to the horizontal arm of the bracket. The bracket may be slidably mounted in relation to the shelf with the use of sliding pins in slots of the bracket's horizontal arm.

The shelf can be equipped with handles in the form of holes or containers. In addition, the shelf can be equipped with a locator system for automatic adjustment of the position of charging device's inductive element in relation to elements that receive electric energy.

Accordingly, the charging device can be attached to a piece of furniture equipped with an armrest. By way of the adjustable position of the shelf bracket, it is possible to quickly and accurately attach the charging device. In addition, mechanical lock variants for adjusting the width of the charging device clamp may also be provided. Furthermore, it is possible to automate the assembly and disassembly of the charging device via the use of a mechanical drive that may be fastened with an electronic control mechanism.

Additionally, a wireless charging function of the charging device may be used for portable phones and tablets, and also support a wide range of other devices, such as a wirelessly powered magnetically mounted lamp or mechanical devices, such as fans or electric shavers. Additionally, cups with drinks may be heated when placed on the shelf by providing power to the cups via electromagnetic induction.

Figure 2:
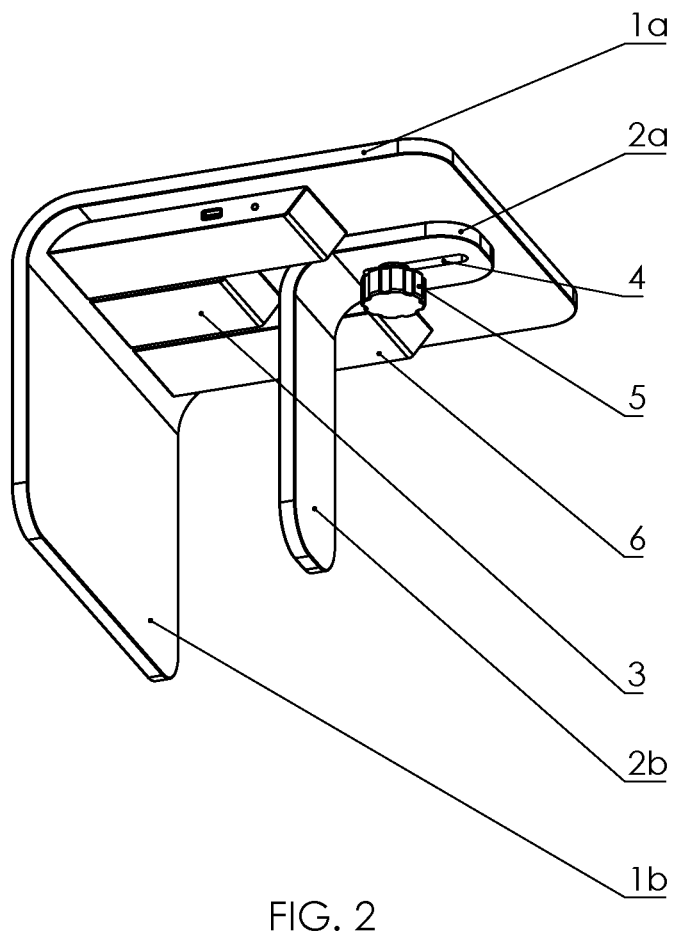
FIG. 2 shows a diagram illustrating a bottom perspective view of a charging device with a manual adjustment feature, according to an embodiment of the present disclosure.
Figure 3:
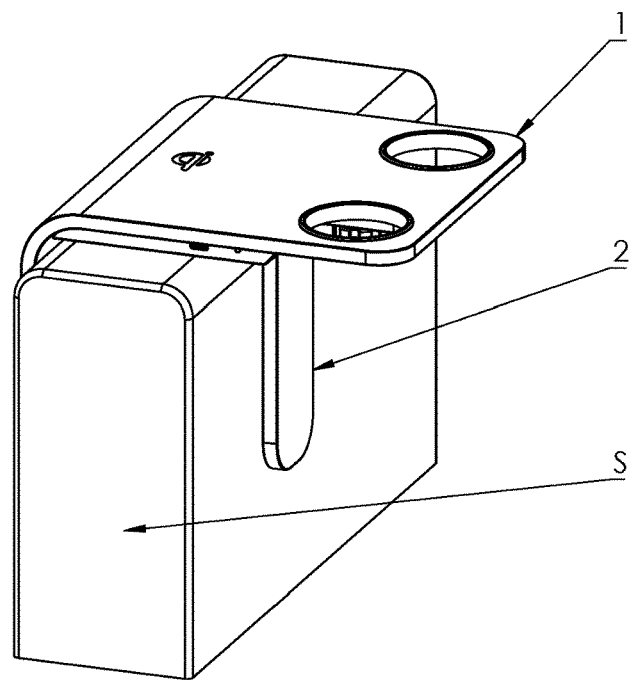
FIG. 3 shows a diagram illustrating a top perspective view of a charging device mounted on the sofa's armrest, according to an embodiment of the present disclosure.
Figure 4:
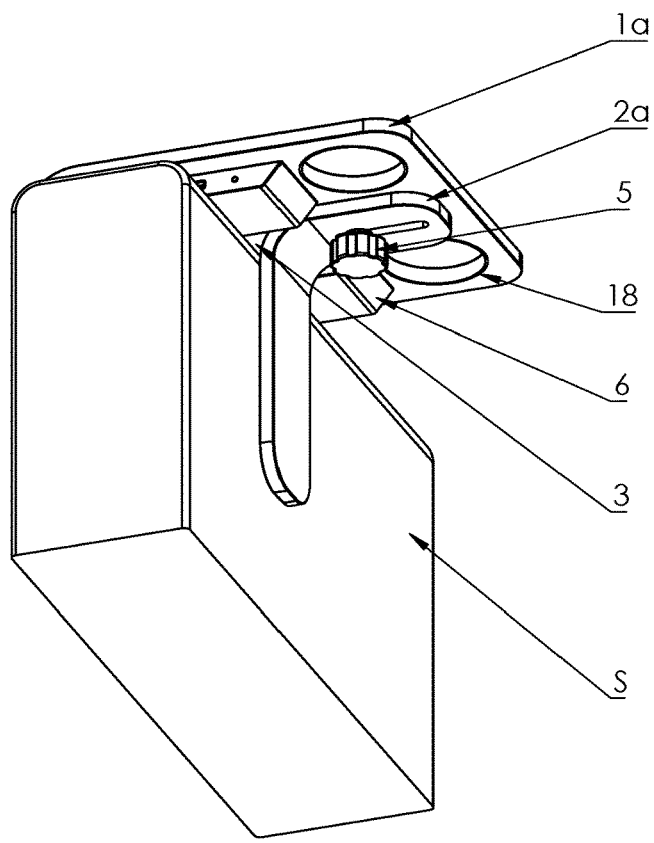
FIG. 4 shows a diagram illustrating a bottom perspective view of a charging device mounted on the sofa's armrest, according to an embodiment of the present disclosure.

FIG. 1 shows a diagram illustrating a top perspective view of a charging device with a manual adjustment feature, according to an embodiment of the present disclosure. FIG. 2 shows a diagram illustrating a bottom perspective view of a charging device with a manual adjustment feature, according to an embodiment of the present disclosure. FIG. 3 shows a diagram illustrating a top perspective view of a charging device mounted on the sofa's armrest, according to an embodiment of the present disclosure. FIG. 4 shows a diagram illustrating a bottom perspective view of a charging device mounted on the sofa's armrest, according to an embodiment of the present disclosure.

Referring to FIGS. 1-4, the charging device has a fixed angular shelf 1 ("shelf" may be used interchangeably with "charging device") with a horizontal arm 1*a*, under which an adjustable angular bracket 2 is placed. The charger 3 is located between portions of the horizontal arm 1*a* on the bottom side of the horizontal arm 1*a*. The horizontal arm 1*a* may be a horizontal base. The bracket 2 is slidably mounted in relation to the angular shelf 1, and is equipped with at least one displacement and positioning locks. The charger 3 may be a wireless induction charger.

The shelf 1 may be formed as an angle. That is, one arm 1*a* of the shelf 1 may be the horizontal base (horizontally positioned). The second arm 1*b* of the shelf 1 may be a vertical support (vertically positioned) adjacent to a vertical side wall of the armrest (e.g., the furniture piece S). Under the horizontal arm 1*a*, the bracket 2 may be mounted and slide in a horizontal direction (e.g., to clamp to the furniture piece S).

The bracket 2 may also be formed as an angle. One arm 2*a* of the bracket 2 may adhere horizontally to the lower surface of the shelf 1 along a portion of the horizontal arm 1*a*. The second arm 2*b* of the bracket 2 may be positioned vertically and perpendicular to the horizontal arm 1*a*. After pressing against the vertical side wall of the armrest S, the second arm 2*b* of the bracket 2 along with the second arm 1*b* of the shelf 1, constitutes a clamp that immobilizes the shelf 1 on the piece of furniture (e.g., an armrest of a sofa, a chair, or a vertical wall of a piece of furniture).

The shelf 1 may be equipped with a wireless charger 3 located in the space under the shelf 1 between its horizontal arm 1*a*, the second arm 1*b* and the arm 2*a* of the bracket 2. The charging surface may be on the top side of the shelf 1 (above its horizontal arm 1*a*).

According to an embodiment, with manual adjustment, the position of the sliding bracket 2 may be locked by tightening the locking screw 5. The locking screw 5 may be screwed from the bottom into the socket in the shelf 1 and pass through a longitudinal slot 4 made in the horizontal arm 2*a* of the bracket 2. The screw 5 may be tightened or loosened without the use of additional tools.

Optionally, under the shelf 1, one or more batteries 6 may be included to allow the operation of the wireless charger 3 without an external power supply. The one or more batteries 6 may be rechargeable using, for example, a standard USB socket. In addition the USB socket can also be used for wired charging of electronic devices. The one or more batteries 6 may also be powered by charged by an external charger.

During manual fastening, the horizontal spacing between the vertical second arm 1*b* and the vertical second arm 2*b* may be adjusted according to a width or thickness of a piece of furniture, on which the charging device shall be mounted.

The shelf 1 may be mounted by placing it on top of the sofa S and locking the bracket 2 in a position so that the bracket 2 is firmly against the side of the sofa. Accordingly, once the shelf 1 is mounted, the wireless charging surface may be located on surface of a piece of furniture.

Figure 5:
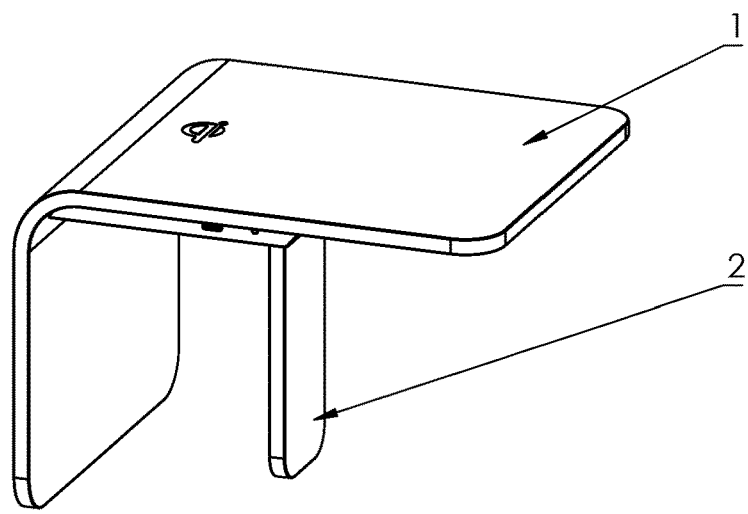
FIG. 5 shows a diagram illustrating a top perspective view of a charging device with a locking latch, according to an embodiment of the present disclosure.
Figure 6:
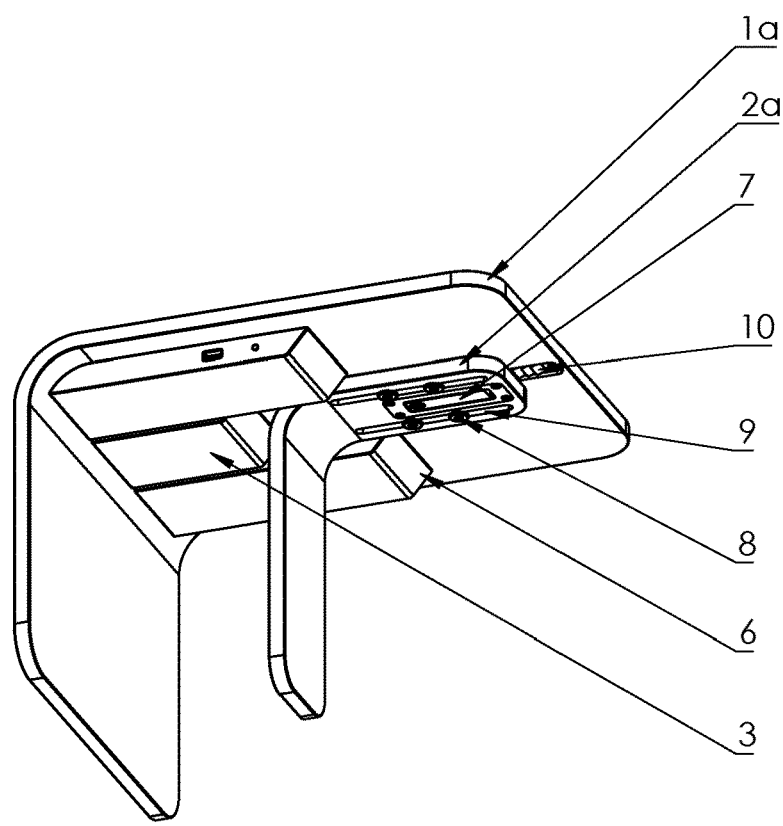
FIG. 6 shows a diagram illustrating a bottom perspective view of a charging device with a locking latch, according to an embodiment of the present disclosure.
Figure 7:
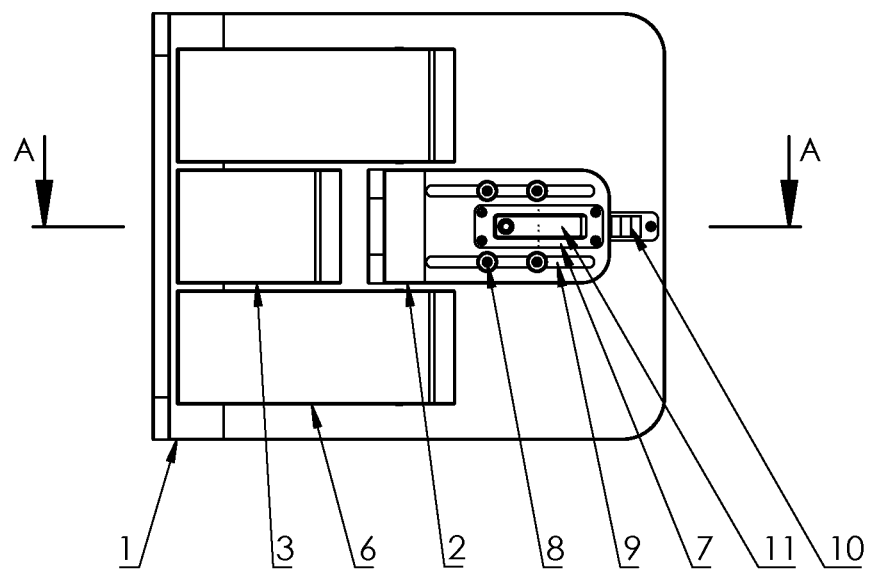
FIG. 7 shows a diagram illustrating a bottom view of a charging device with a locking latch, according to an embodiment of the present disclosure.
Figure 8:
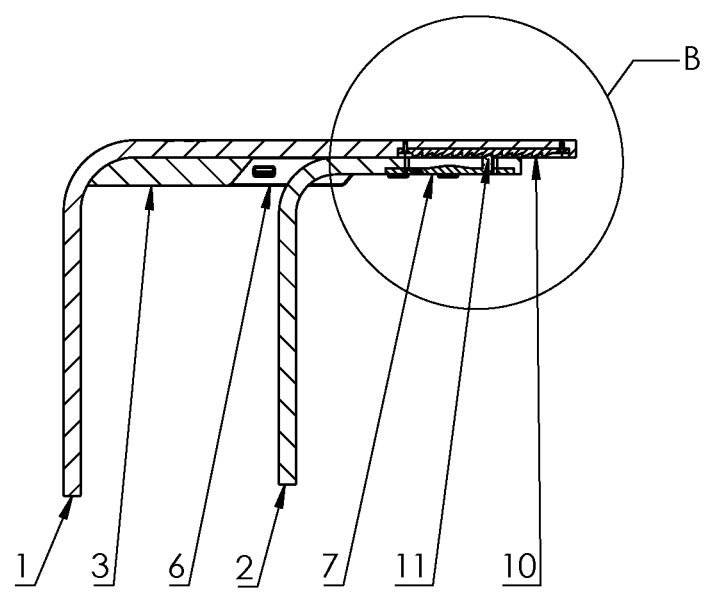
FIG. 8 shows a diagram illustrating a profile view of a charging device with a locking latch, according to an embodiment of the present disclosure.
Figure 9:
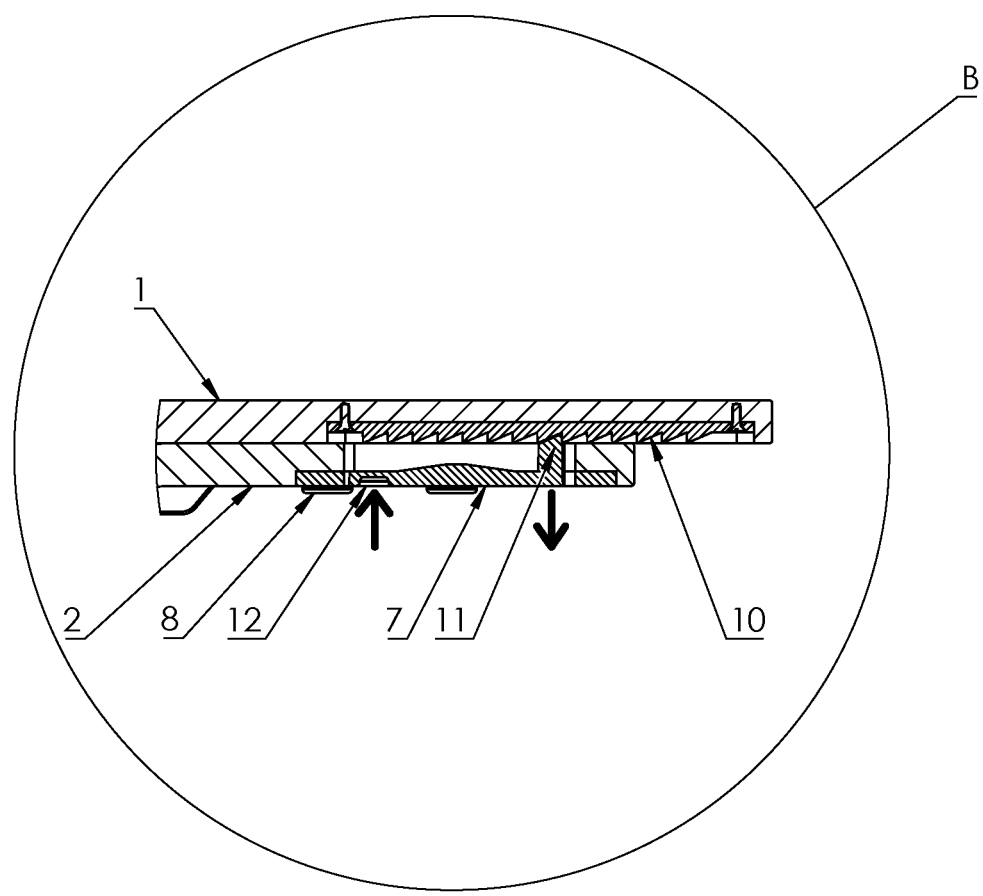
FIG. 9 shows a diagram illustrating details of section B of FIG. 8, according to an embodiment of the present disclosure.

FIG. 5 shows a diagram illustrating a top perspective view of a charging device with a locking latch, according to an embodiment of the present disclosure. FIG. 6 shows a diagram illustrating a bottom perspective view of a charging device with a locking latch, according to an embodiment of the present disclosure. FIG. 7 shows a diagram illustrating a bottom view of a charging device with a locking latch, according to an embodiment of the present disclosure. FIG. 8 shows a diagram illustrating a profile view of a charging device with a locking latch, according to an embodiment of the present disclosure. FIG. 9 shows a diagram illustrating details of section B of FIG. 8, according to an embodiment of the present disclosure.

FIGS. 5-9 illustrate an alternative manual adjustment mechanism for the shelf 1.

Referring to FIGS. 5-9, the position of the sliding bracket 2 may be locked by a single-acting ratchet mechanism 7 positioned between the horizontal arm 2a of the bracket 2 and the horizontal arm 1a of the shelf 1.

The bracket 2 may be fastened to the shelf 1 with the use of sliding pins 8 in slots 9 of the horizontal arm 2a of the bracket 2 in a manner that enables their mutual sliding movement.

The toothed locking bar 10 may be embedded in the horizontal arm 1a of the shelf 1 in its bottom recess (for example, by screwing with assembly screws). The latch 11 may be embedded in the horizontal arm 2a of the bracket 2 (in its longitudinal through hole). The latch 11 may be made of a resilient material and has a pressure zone 12 to allow it to be released or unlocked from the horizontal arm 2a of the bracket 2.

While the bracket 2 is moved, the latch 11 may automatically be locked into grooves of the toothed bar 10. The ratchet mechanism 7 may be unidirectional and automatically lock while plates move closer together when the adjustable support on the bracket 2 is moved towards the shelf 1.

In order to unlock the bracket 2, pressure may be applied to the latch 11 in its pressure zone 12—this will release the latch 11 from grooves of the toothed bar 10. Thus, the bracket 2 may be considered to be an adjustable bracket.

The manual fastening system described above includes a self-actuating mechanical latch 11 that may lock into place by manually moving bracket 2 to firmly position the shelf 1 in its desired location. Lessening of the force applied to move the bracket 2 may cause a slight retraction of the bracket 2. This movement may actuate the ratchet locking system so that the bracket 2 maintains a position with respect to the shelf 1. In order to detach the shelf 1, a force may be applied to the pressure zone 12 to release the latch 11 from the toothed bar 10, and the bracket 2 may be slid away from the second arm 1b of the shelf 1.

Figure 10:
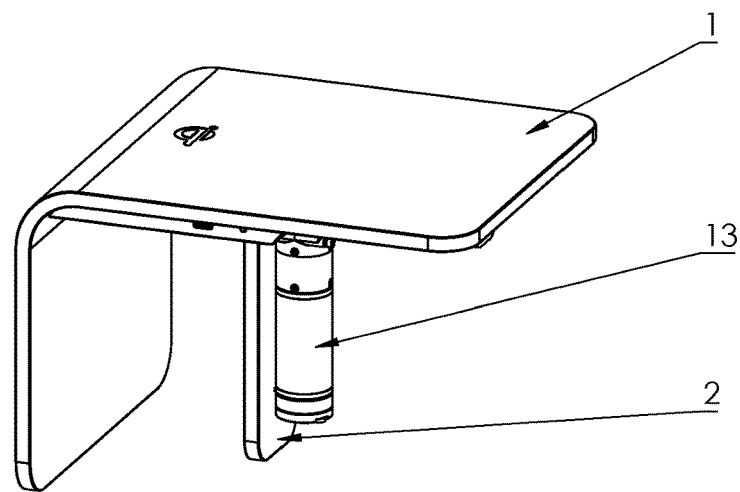
FIG. 10 shows a diagram illustrating a top perspective view of a charging device with a motor for adjustment, according to an embodiment of the present disclosure.
Figure 11:
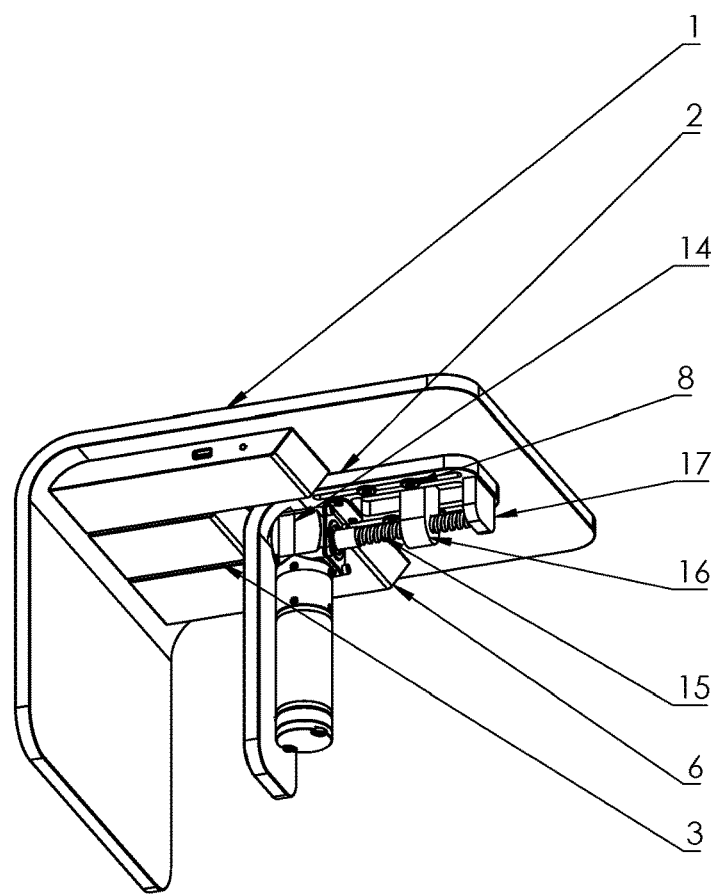
FIG. 11 shows a diagram illustrating a bottom perspective view of a charging device with a motor for adjustment, according to an embodiment of the present disclosure.
Figure 12:
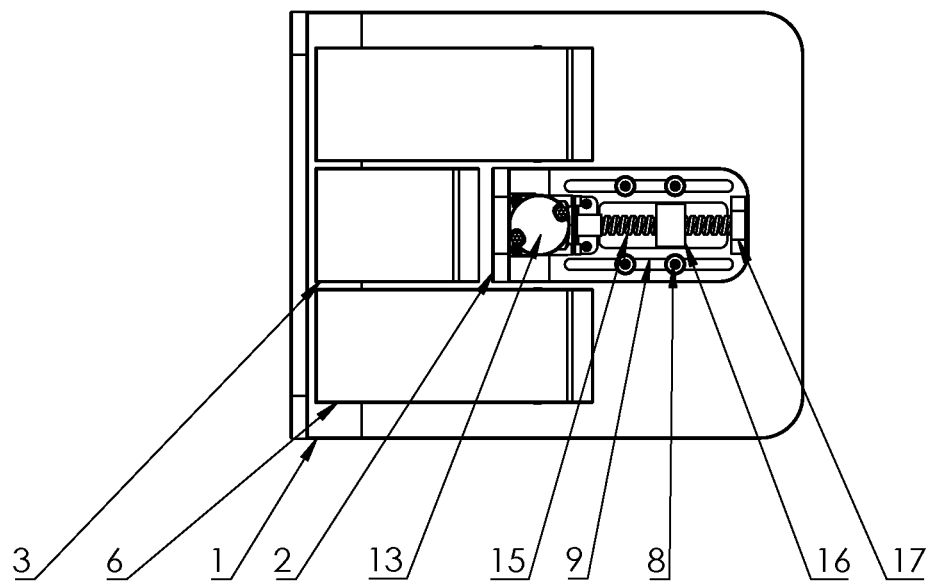
FIG. 12 shows a diagram illustrating a bottom view of a charging device with a motor for adjustment, according to an embodiment of the present disclosure.
Figure 13:
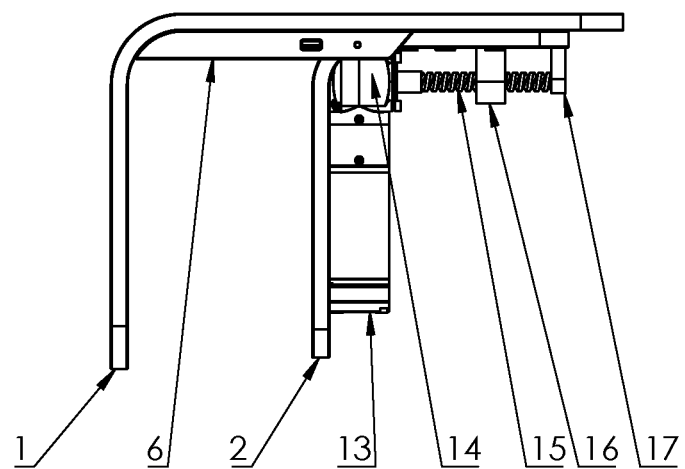
FIG. 13 shows a diagram illustrating a profile view of a charging device with a motor for adjustment, according to an embodiment of the present disclosure.

FIG. 10 shows a diagram illustrating a top perspective view of a charging device with a motor for adjustment, according to an embodiment of the present disclosure. FIG. 11 shows a diagram illustrating a bottom perspective view of a charging device with a motor for adjustment, according to an embodiment of the present disclosure. FIG. 12 shows a diagram illustrating a bottom view of a charging device with a motor for adjustment, according to an embodiment of the present disclosure. FIG. 13 shows a diagram illustrating a profile view of a charging device with a motor for adjustment, according to an embodiment of the present disclosure.

FIGS. 10-13 illustrate an alternative motor adjustment mechanism for the shelf 1.

Referring to FIGS. 10-13, the motor 13 is, for example, an electric motor that is connected via a gear 14 with a screw 15 cooperating with a nut 16. The nut 16 is attached to the lower surface of the horizontal base 1a of the shelf 1 and passes through the longitudinal hole in the arm 2a of the bracket 2. The other end of the screw 15 is placed in the yoke 17 fixed to the horizontal portion of the bracket 2. The screw 15 along with the nut 15 and the yoke 17 constitute an element of the drive unit of the bracket 2. The bracket 2 is slidably mounted in relation to the shelf 1 with the use of sliding pins 8 in slots 9 of the horizontal arm 2a of the bracket 2—in a manner enabling their mutual sliding movement.

This execution method of positioning the shelf 1 may be modified by the use of other mechanical coupling mechanisms for converting rotational motion to translation motion. The solution can be any application of a screw with a nut, toothed bar, chains, cables or other mechanical system that performs this function.

Therefore, fixing the shelf 1 to a piece of furniture can be done by automatic setting of the adjustable bracket, which (using, for example, an intelligent control program) will start the motor driving the adjustable bracket and (as a result of the operation of a feedback line in the form of information about the pressure force against a wall of a piece of furniture) will stop the motor in order to obtain the adequate gripping force. This force will result in a stable seating of the shelf—without damaging delicate surfaces of a piece of furniture.

In this example, operation of adjusting the shelf 1 may be bases on manual activation—pressing the button of the automatic fixing system, which, in turn, may start the sequence of checking the correctness of the shelf's placement in a given place of a piece of furniture and start the motor so as to cause the movement of the adjustable bracket in the blocking direction, while checking the pressure force in real time. This may enable the motor to shutdown when a predetermined contact pressure threshold is reached. Simultaneously, such a system may avoid overloading the system or inadequately fastening of the shelf.

Once the shelf 1 is secured, pressing the activation button again may cause the automatic movement of the adjustable bracket in the unlocking direction (e.g., towards the starting position). The starting position may enable disassembly, movement or relocation of the shelf 1.

Figure 14:
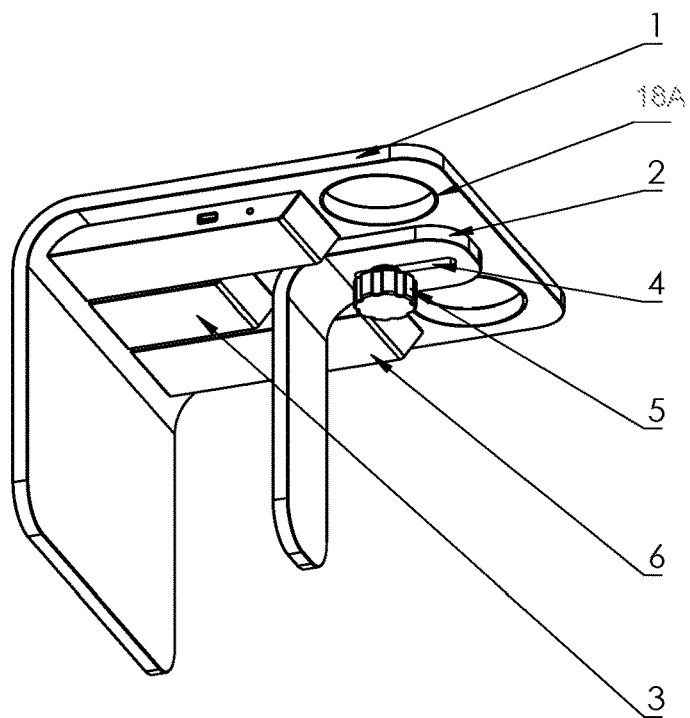
FIG. 14 shows a diagram illustrating a bottom perspective view of a charging device with additional handles in the form of holes, according to an embodiment of the present disclosure.
Figure 15:
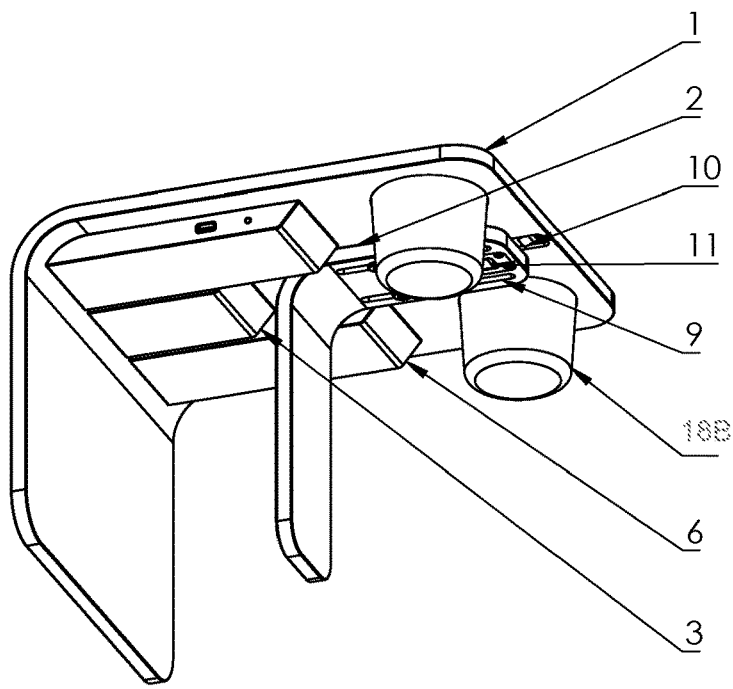
FIG. 15 shows a diagram illustrating a bottom perspective view of a charging device with additional handles in the form of containers, according to an embodiment of the present disclosure.

FIG. 14 shows a diagram illustrating a bottom perspective view of a charging device with additional handles in the form of holes, according to an embodiment of the present disclosure. FIG. 15 shows a diagram illustrating a bottom perspective view of a charging device with additional handles in the form of containers, according to an embodiment of the present disclosure.

Referring to FIGS. 14-15, the horizontal arm 1a of the shelf 1 is equipped with additional holders 18A and 18B, in which various elements can be fastened. FIG. 14 presents holder 18A in the form of holes. FIG. 15 shows holders 18B in the form of containers.

Additionally, the wireless charging system can be used to transfer energy to other devices. The wireless charging device (e.g., the shelf 1) can be equipped with a locator system for automatic adjustment of the position of the charger's inductive element 3 in relation to elements receiving electric energy. For example, if an energy receiving device (e.g., a mobile phone) is placed on top of the shelf 1, then the charger's inductive element 3 may include a mechanical mechanism to move an induction (based on a strength of a wireless signal) coil to a position to most efficiently wirelessly charge the energy receiving device.

Moreover, the use of a wireless charging device with a locator function may enable the placement of additional energy-receiving elements in an indefinite number of locations (e.g., it may not necessary to place the energy receiving element directly above the middle of the wireless charging device because the locator system (itself) will correct the position of the inductive element of the wireless charger in a manner ensuring the highest charging efficiency). The shelf 1 with an adjustable fixing bracket 2 along with a locator is a solution for the free organization and arrangement of energy receiving devices that are placed on the shelf.

Figure 16:
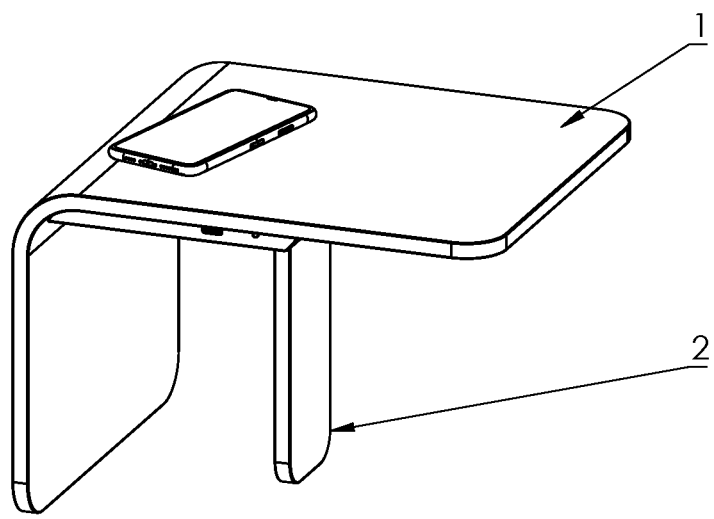
FIG. 16 shows a diagram illustrating a top perspective view of a charging device with a phone charging function, according to an embodiment of the present disclosure.

FIG. 16 shows a diagram illustrating a top perspective view of a charging device with a phone charging function, according to an embodiment of the present disclosure.

Referring to FIG. 16, the basic functionality of the wireless charging device is shown in FIG. 16 by using the wireless charging device for wireless charging a mobile phone.

Figure 17:
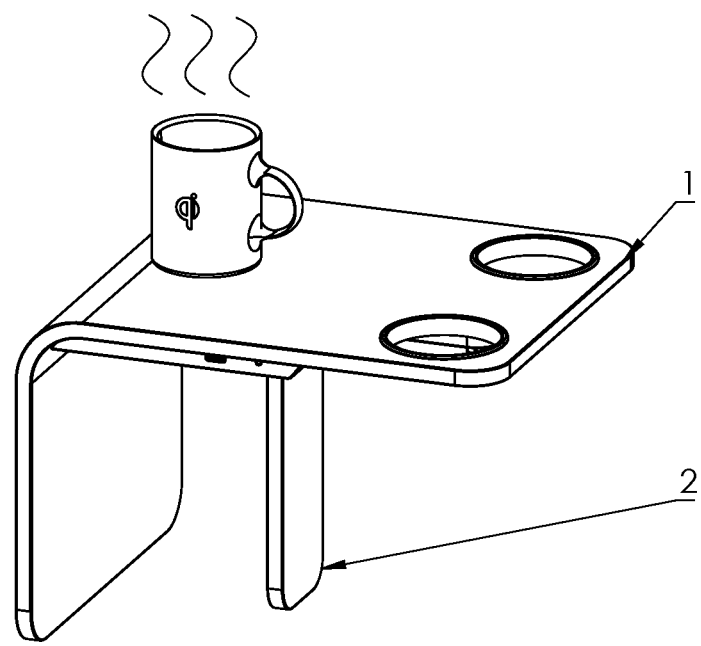
FIG. 17 shows a diagram illustrating a top perspective view of a charging device with a cup beating function, according to an embodiment of the present disclosure.

FIG. 17 shows a diagram illustrating a top perspective view of a charging device with a cup heating function, according to an embodiment of the present disclosure.

Referring to FIG. 17, the wireless charging device is shown to heat a cup with a drink using an induction mechanism, which may be the same mechanism used to wirelessly charge an external electronic device, such as a phone.

Figure 18:
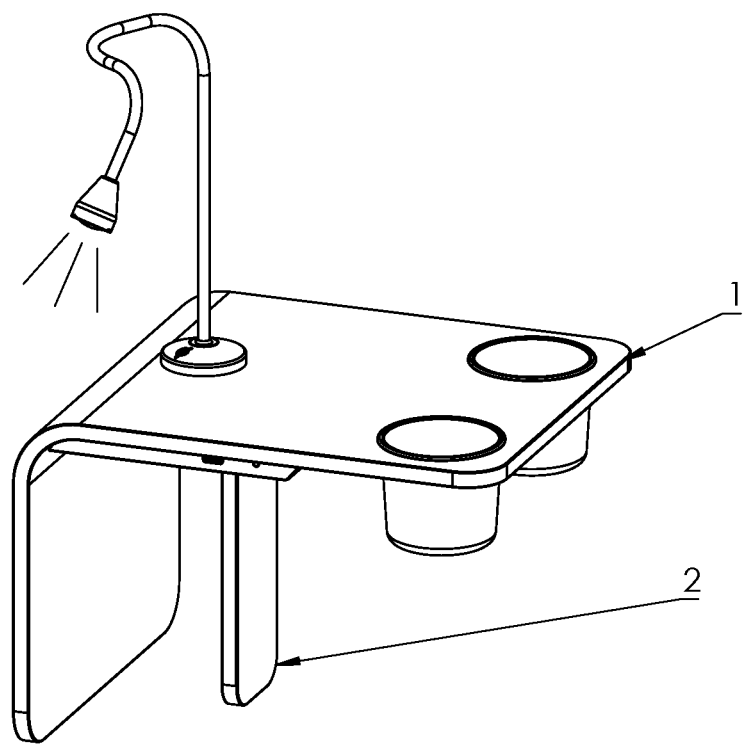
FIG. 18 shows a diagram illustrating a top perspective view of a charging device with a function of charging a portable lamp, according to an embodiment of the present disclosure.

FIG. 18 shows a diagram illustrating a top perspective view of a charging device with a function of charging a portable lamp, according to an embodiment of the present disclosure.

Referring to FIG. 18, the wireless charging device is shown to power or charge a portable lamp. It is possible to use the wireless charging device for charging any other mobile electronic device or utility item with an electric drive.

Figure 19:
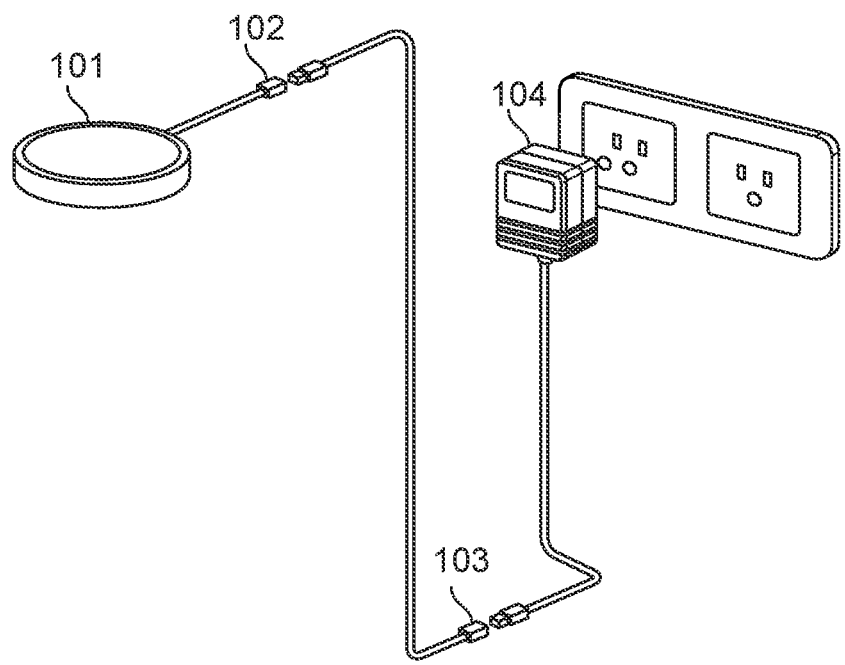
FIG. 19 shows a diagram illustrating a configuration of a wireless charger, according to an embodiment of the present disclosure.

FIG. 19 is a diagram illustrating a configuration of a wireless charger, according to an embodiment of the present disclosure.

The wireless charger of FIG. 19 includes a charging pad 101. The charging pad 101 may include a coil capable of producing an electromagnetic field that extends outward from the charging pad 101. The coil may be embedded inside the charging pad 101 so that an electronic device can be placed in an electromagnetic field by being placed on top of or near a surface of the charging pad 101. The charging pad 101 may be attached to a first cable (i.e., wire) which connects to a first electrical connector 102.

The first electrical connector 102 is connected to a second cable which is connected to a second electrical connector 103. The second electrical connector 103 is connected to a third cable which connects to the wall power supply 104. The first electrical connector 102 and the second electrical connector 103 are detachable such that each may be used to connect or disconnect the charging pad 101 from the wall power supply 104.

The wall power supply 104 may connect to a standard United States power supply of 120 volts (V) at 60 hertz (Hz), or may be connected to other power supply voltages and/or frequencies (i.e., alternating current and/or direct current power).

The first electrical connector 102 and the second electrical connector 103 are detachable, therefore the charging pad 101 may be detached from the second cable, the third cable, and the wall power supply 104. Likewise, the wall power supply 104 may be detached from the second cable, the first cable, and the wireless charger.

An electrical connector may be any device capable of forming an electrical connection among two or more electronic circuits. That is, when an electrical connector is in a disconnected state, the two or more electronic circuits may not be electronically coupled to each other. When an electrical connector is in a connected state, the two or more electronic circuits may be electronically coupled to each other.

Figure 20:
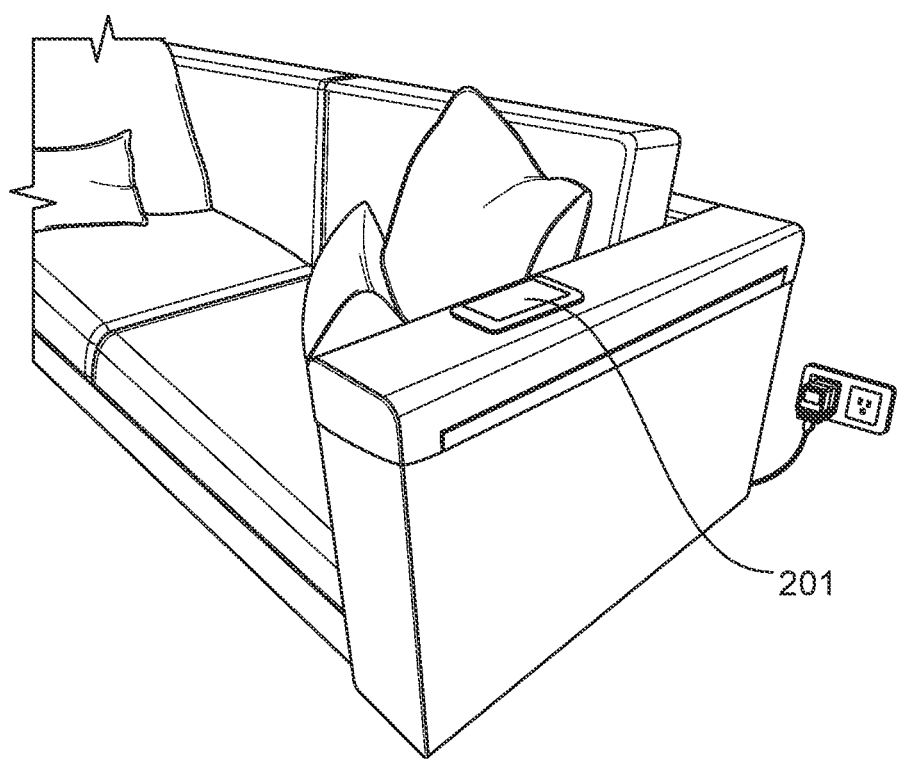
FIG. 20 shows a diagram illustrating a sofa armrest with a wireless charger embedded therein, according to an embodiment of the present disclosure.

FIG. 20 shows a diagram illustrating a sofa armrest with a wireless charger embedded therein, according to an embodiment of the present disclosure.

Referring to FIG. 2, the wireless charger is embedded into the armrest of the sofa such that an electronic device 201 may be wirelessly charged by being placed on top of the armrest near the embedded wireless charger.

By embedding the wireless charger inside of the armrest of the sofa, many of the wires of the wireless charger are hidden from view such that the charging configuration is aesthetically pleasing.

Figure 21:
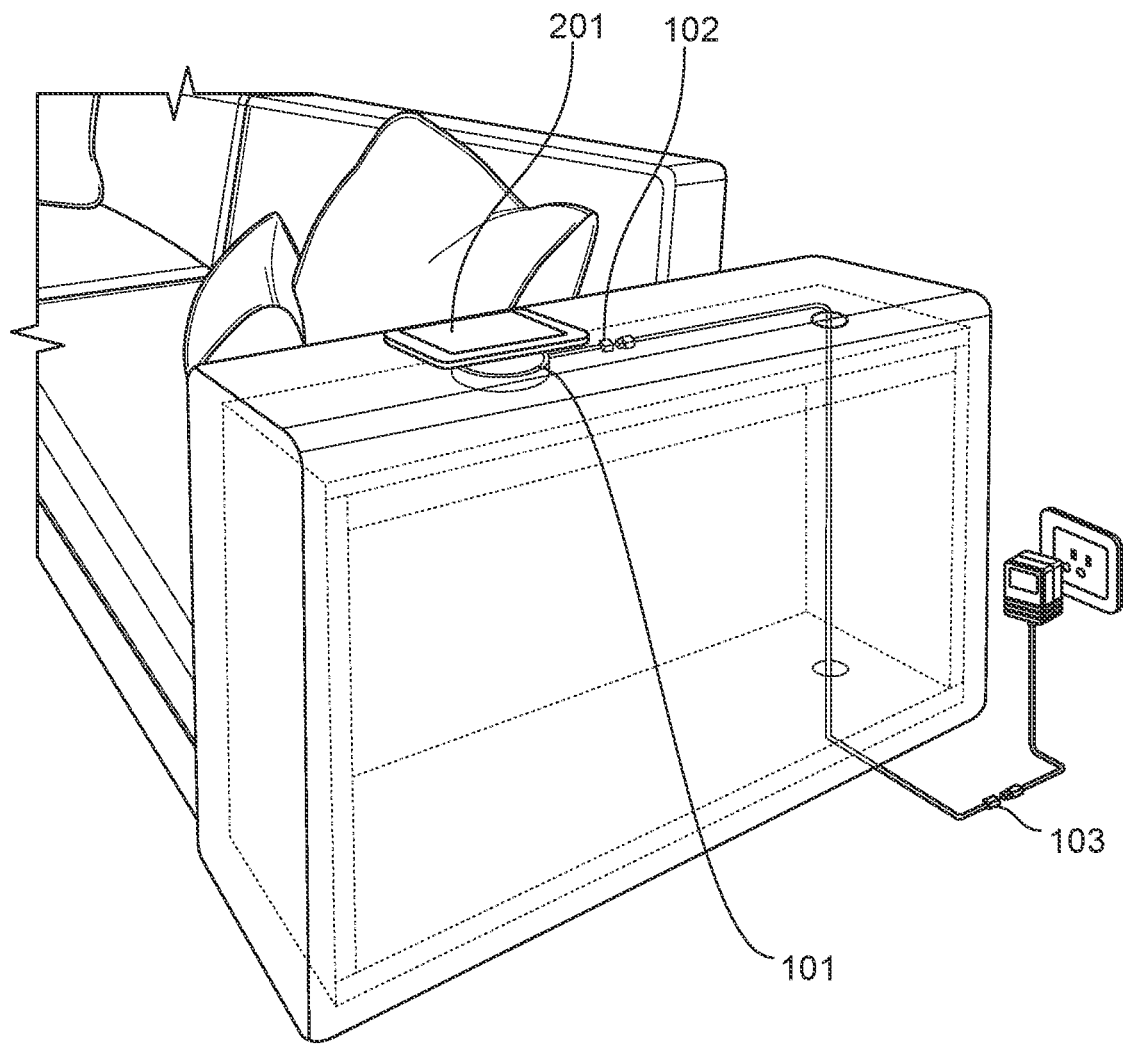
FIG. 21 shows a diagram illustrating a transparent view of a configuration of a wireless charger embedded in a sofa armrest, according to an embodiment of the present disclosure.

FIG. 21 shows a diagram illustrating a transparent view of a configuration of a wireless charger embedded in a sofa armrest, according to an embodiment of the present disclosure.

In particular, the positioning of the charging pad 101, the first electrical connector 102, and the second electrical connector 103 within the armrest is revealed by the transparent armrest.

The charging pad 101 is located a predetermined distance (i.e., 2.7 to 3.3 millimeter) below the top surface of the armrest. The first electrical connector 102 is located inside of a top portion of the armrest and the second electrical connector 103 is located outside of the armrest such that the second electrical connector 103 can easily be accessed without having to disassemble, reconfigure, or open the sofa armrest. Thus, the charging pad 101, which is embedded in the sofa armrest, may be disconnected from the wall power source by adjusting the second electrical connector 103 to be in a disconnected state (i.e., opening the second electrical 103).

Figure 22:
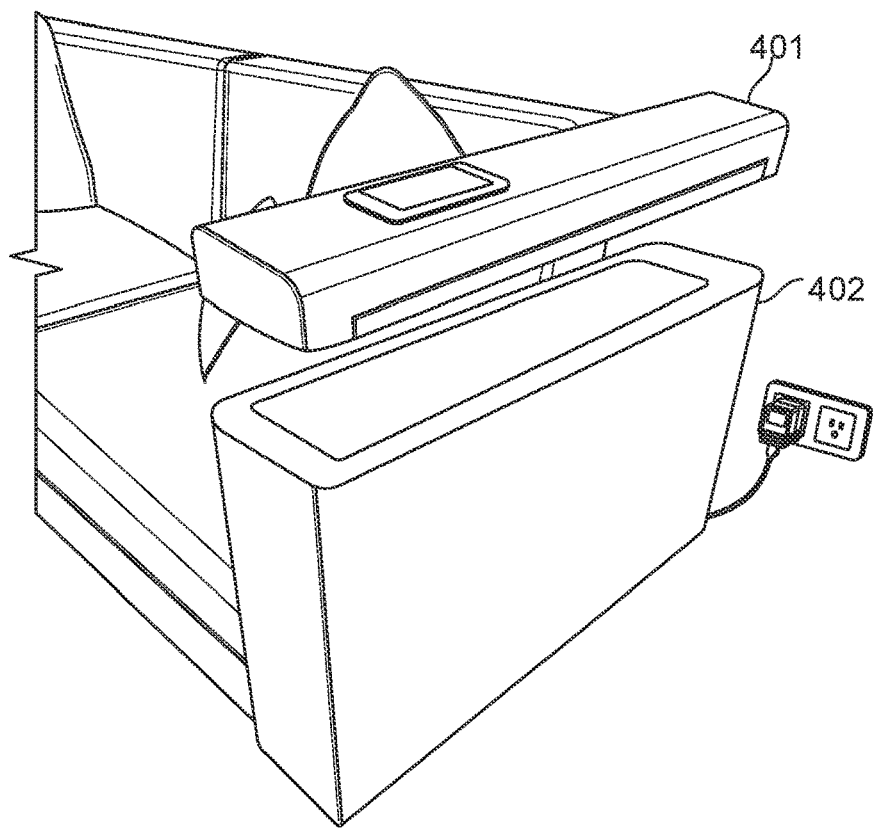
FIG. 22 shows a diagram illustrating accessing an interior of a sofa armrest via a service access point, according to an embodiment of the present disclosure.

FIG. 22 shows a diagram illustrating accessing an interior of a sofa armrest via a service access point, according to an embodiment of the present disclosure.

The service access point enables a top portion 401 of the armrest to be separated from a lower portion 402. The service access point may be a zipper or other means (i.e., a magnet or a locking mechanism) for attaching/detaching the top portion 401 to the lower portion 402. Alternatively, rather than completely separating a top portion 401 of the armrest from a lower portion 402 of the armrest, a service access point may be accessed through a pocket, hole, or window, which may be opened using a zipper, magnet, or a locking mechanism.

The service access point provides access to the charging pad 101, the first electrical connector 102, and/or the second electrical connector 103 when they are located inside of the armrest.

According to the present disclosure, a power charger can easily be replaced by using the service access point. For example, a user may notice that his or her electronic device (i.e. mobile phone) is not properly charging, and he or she may be inclined to attempt to fix the wireless charger. If the charger continues to not be working properly, then the user may decide that it is necessary to gain access to the charging pad 101 to troubleshoot it and/or replace it. Alternatively, if the user cannot gain access to the charging pad 101, then the user may decide it is necessary to replace the entire piece of furniture which houses the charging pad 101.

The service access point provides access to the interior of the sofa armrest, thereby allowing the user to troubleshoot and/or replace a portion of the wireless charger. For example, the first electrical connector 102 and/or the second electrical connector 103 may be switched to a disconnected state so that the top portion 401 of the armrest can be separated from the lower portion 402 of the armrest without wires limiting physical access to the service access point.

Thus, the service access point may allow a user to replace the wireless charger without having to replace the sofa armrest. In other words, if the wireless charger is built into the sofa armrest and cannot easily be accessed, then a user may be inclined to replace the sofa armrest and/or the sofa if the wireless charger is not operating properly. As described with reference to FIGS. 1-4, the wireless charger can be easily accessed through a service access point to allow a user to replace all or part of the wireless charger without having to replace all or part of the sofa armrest.

Figure 23:
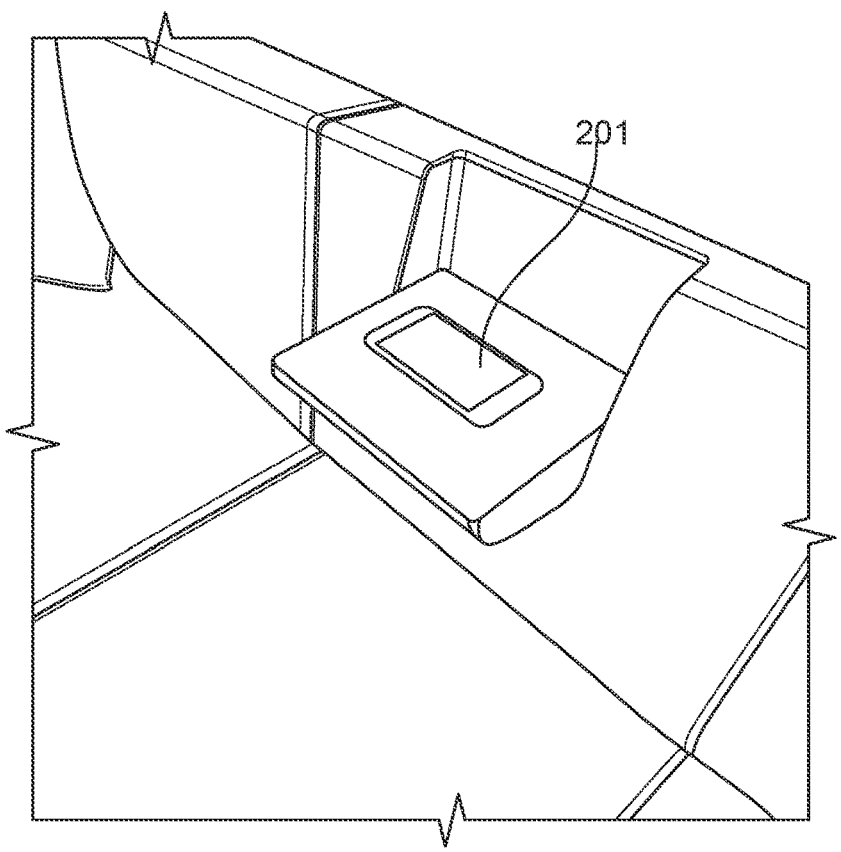
FIG. 23 shows a diagram illustrating a sofa cushion with a wireless charger embedded therein, according to an embodiment of the present disclosure.

FIG. 23 shows a diagram illustrating a configuration of a wireless charger embedded in a sofa cushion, according to an embodiment of the present disclosure.

Referring to FIG. 23, the sofa cushion may flip down to provide access to the embedded wireless charger. That is, the charging pad 101 of the wireless charger can be located in a sofa cushion that may be opened from a first position to a second position. The first position may be a regular sofa orientation which a sofa cushion can be ordinary used (i.e., by allowing the user to sit on or against it). The second position may be a flipped down position of a portion of the sofa cushion which may provide an area for an electronic device 201 to be placed such that a wireless charger embedded in the flipped down portion of the sofa provides wireless charging to the electronic device 201.

Figure 24:
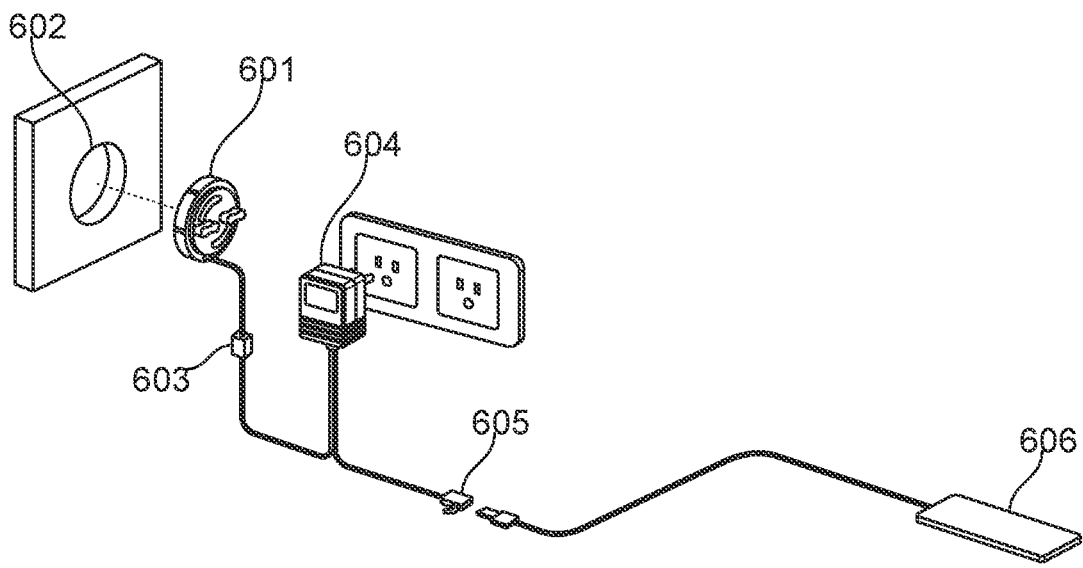
FIG. 24 shows a diagram illustrating a configuration of a charger, according to an embodiment of the present disclosure.

FIG. 24 shows a diagram illustrating a configuration of a charger, according to an embodiment of the present disclosure.

Referring to FIG. 24, a wireless charging pad (i.e., a coil for electromagnetic induction) may be located inside of a locking mechanism 601. The coil may be wound around a central point for generating an electromagnetic field. The locking mechanism 601 may snugly fit inside of a pre-bored hole 602. The locking mechanism 601 including the wireless charging pad can then be placed into a section of the sofa.

Sofas and other furniture for use with a wireless charging pad may contain pre-bored holes, which may be custom-made by a furniture factory. The pre-bored holes may be located on the bottom of, on the side of, on the top of, inside of, or outside of furniture to accommodate the wireless charging device. For example, a wireless charging device having a locking mechanism 601 may be placed into one of the pre-bored holes 602 and placed into a locked position such that an edge of the furniture is flush. Additionally, a furniture cover may be placed over the locking mechanism 601 in the pre-bored hole 602.

When the locking mechanism 601 is placed into a pre-bored hole, a user may lock the locking mechanism 601 into place to affix a charger to the furniture. When it is desirable to remove the charger, a customer may unlock the locking mechanism 601 to remove it from the furniture. The locking mechanism 601 may include part or all of the charger. The charger may be a wired charger or a wireless charger.

The locking mechanism 601 may be connected by a first wire to an electrical connector 603, which is connected to a wall power supply 604. A USB power extension may be connected to the wall power supply 604 such that power can simultaneously be output to the wireless charging pad in the locking mechanism 601 through the electrical connector 603, and to the USB power extension 605. An electronic device 606 may be connected to the USB power extension 605 to receive a charge.

In order to attach the locking mechanism 601 to the furniture, the locking mechanism 601 may be placed into a pre-bored (previously drilled) mounting hole in the furniture. Next, a twist-lock turning part of the locking mechanism 601 may be twisted in a predetermined direction (e.g., clockwise). When the locking mechanism 601 is twisted in the predetermined direction, elastic latches may protrude in a direction away from the center of the locking mechanism 601, causing the diameter of the locking mechanism 601 to increase. In this manner, the diameter of the locking mechanism 601 in the unlocked position may be less than the diameter of the locking mechanism 601 in the locked position.

By increasing the diameter of the locking mechanism 601 in the locked position, the locking mechanism 601 may be affixed to the interior walls of the pre-bored hole in the furniture. In this way, the locking mechanism 601 may be securely attached to the furniture when placed in the locked position.

Alternatively, the locking mechanism 601 may be attached to the pre-bored hole in the furniture using adhesive, latches, sliders, or clamps to fasten the wireless charger mounting mechanism into an intended position.

Accordingly, a user may make an installation decision regarding whether or not to install the locking mechanism 601 with a charging device in his/her furniture. This solution of reduces the risk of returning expensive furniture due to unsatisfactory performance of charging devices because a user may replace and/or reinstall part or all of a charging device associated with the furniture.

Figure 25:
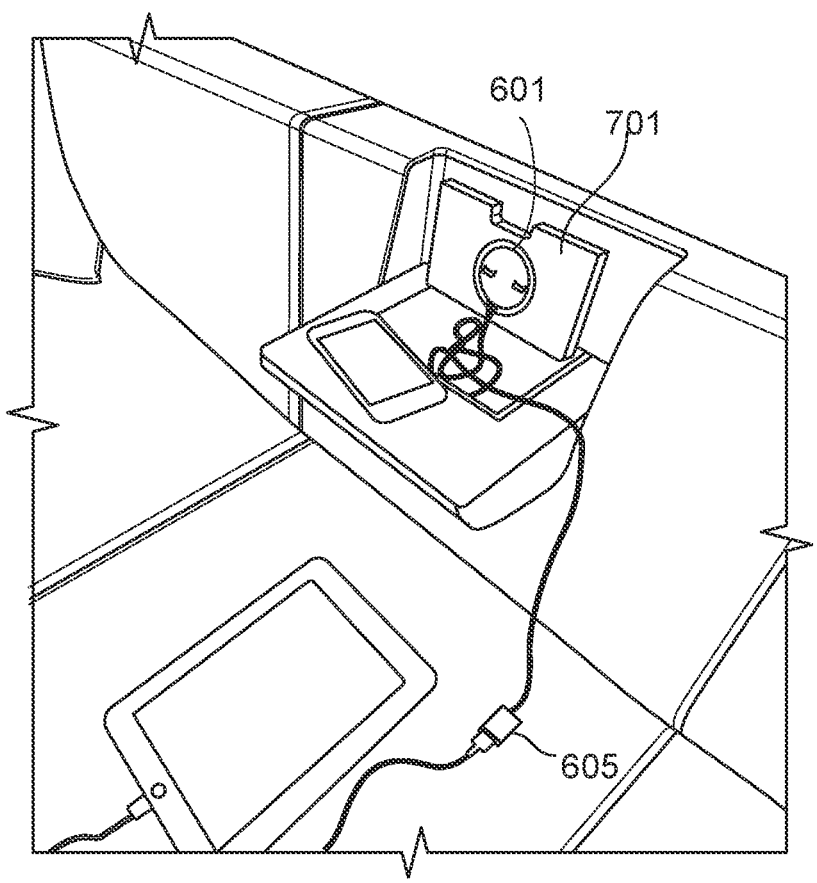
FIG. 25 shows a diagram illustrating a configuration of a charger embedded in a sofa cushion with a USB extension, according to an embodiment of the present disclosure.

FIG. 25 shows a diagram illustrating a configuration of a charger embedded in a sofa cushion with a USB extension, according to an embodiment of the present disclosure.

Referring to FIG. 25, the locking mechanism 601 may be locked into place inside of a portion of a sofa cushion. As illustrated in FIG. 25, a portion of the sofa cushion can be flipped down from a first position (i.e., closed position) to a second position (open position). The locking mechanism 601 may be in a locked position in a pre-bored hole. The pre-bored hole may be a part of a cover 701 which may be opened or closed to access an inside section of the portion of the flipped-down sofa cushion. The inside section of the portion of the sofa cushion may be used to place wires (i.e., USB power extension 605) when it is not being used.

Thus, a user may flip down a portion of a sofa cushion, thereby gaining access to the locking mechanism 601 having an embedded wireless charging pad. A user may charge a first electronic device by placing it on or near the locking mechanism 601 having the embedded wireless charging pad. The user may simultaneously charge a second electronic device by connecting it to the USB power extension 605.

Figure 26:
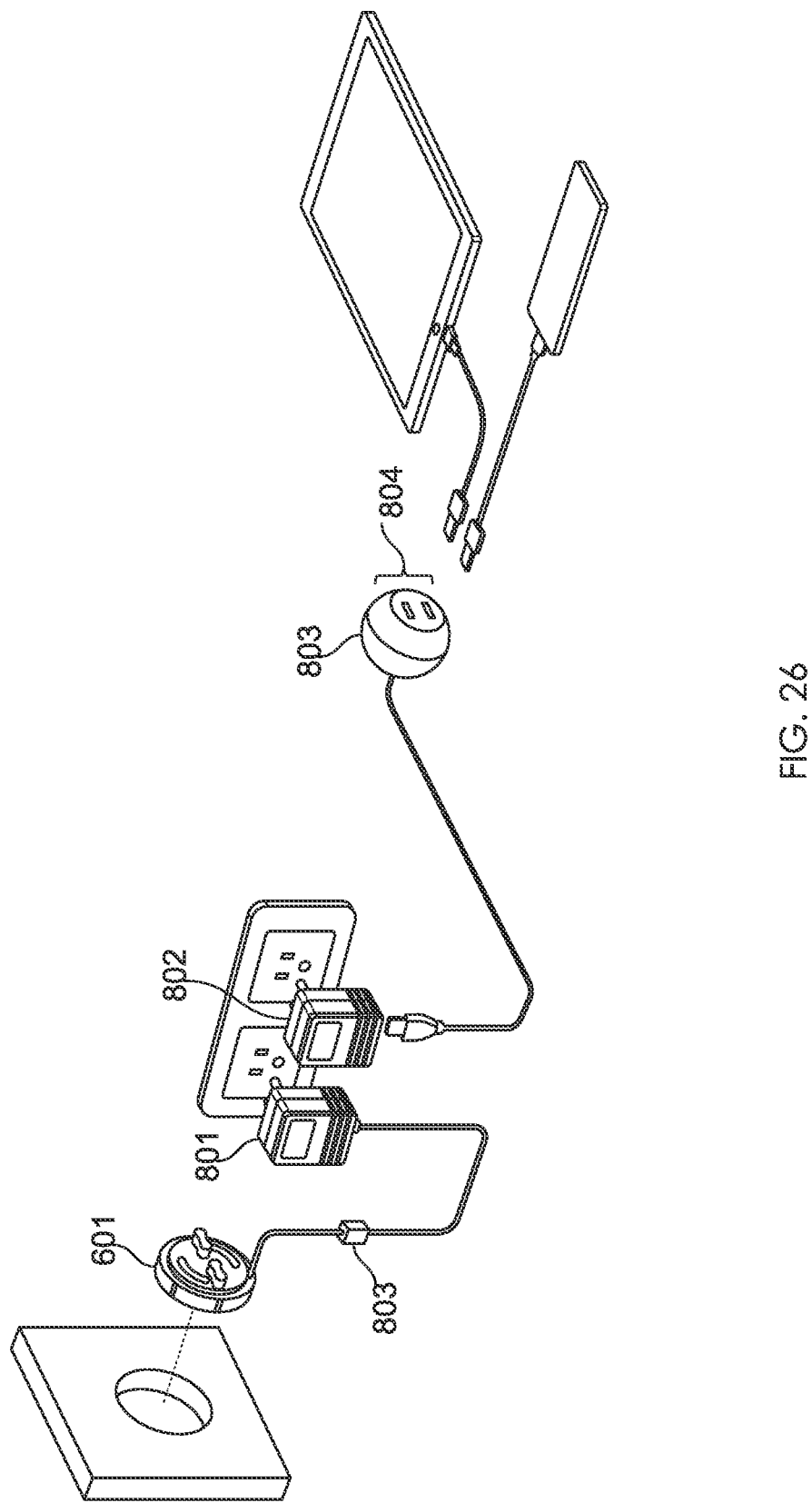
FIG. 26 shows a diagram illustrating a configuration of a wireless charger and a configuration of a wired ball USB charger, according to an embodiment of the present disclosure.

FIG. 26 shows a diagram illustrating a configuration of a wireless charger and a configuration of a wired ball USB charger, according to an embodiment of the present disclosure.

Referring to FIG. 26, a locking mechanism 601, including a wireless charging pad embedded therein, is connected to the power supply 801 through the electrical 603. The power supply 801 connects directly to the electrical 603 to provide power to the wireless charging pad embedded in the locking mechanism 601.

Additionally, a second power supply 802 may provide power to a USB ball charger 803. The USB ball charger 803 may be detachable from the second power supply 802 and may have two USB ports 804 for simultaneously charging two electronic devices through the two USB ports 804. In this manner, the USB ball charger 803 can easily be moved and placed in the best suited location for charging electronic devices.

Figure 27:
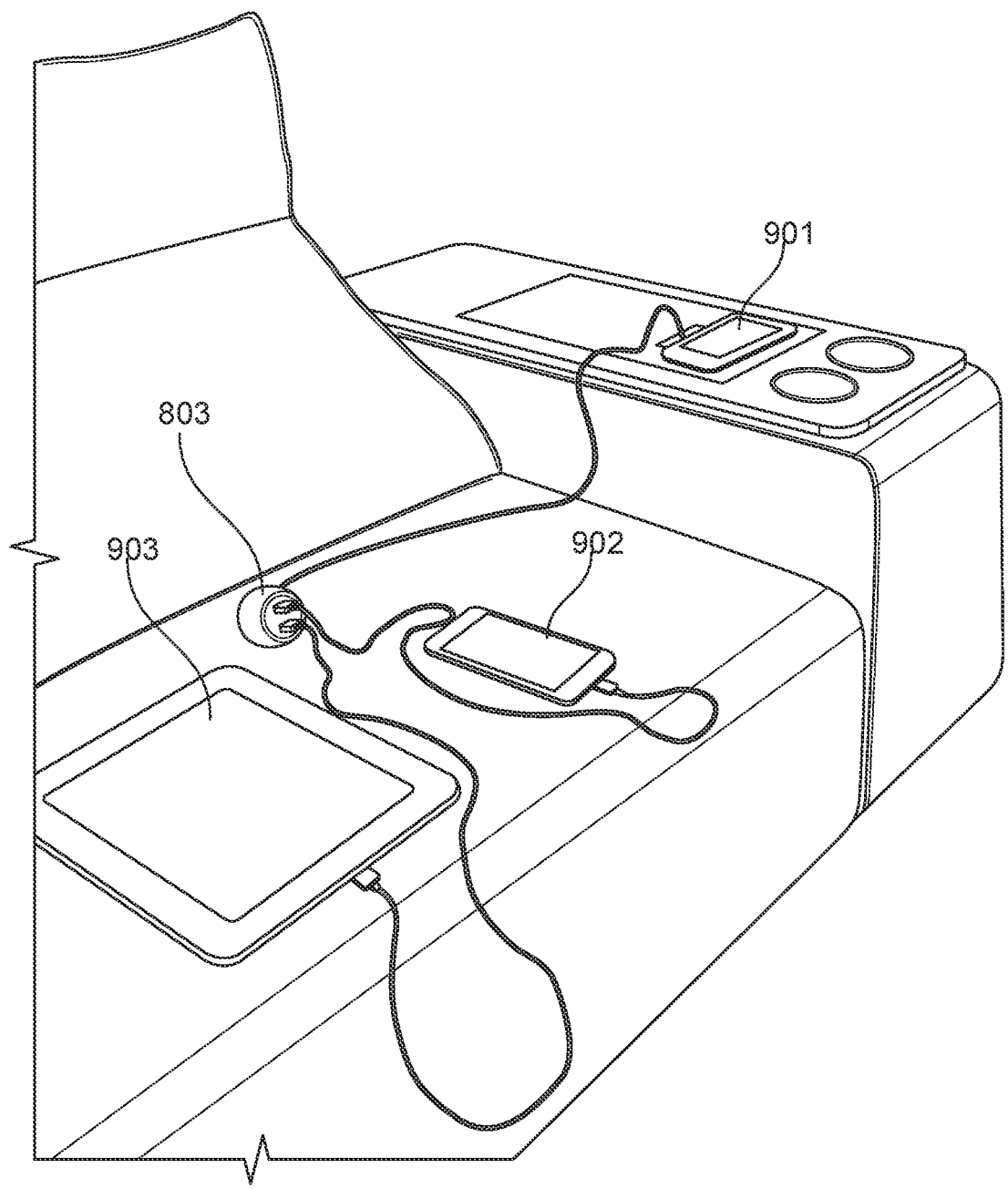
FIG. 27 shows a diagram illustrating a configuration of a charger embedded in a middle section with additional power outlets and a wired ball USB splitter, according to an embodiment of the present disclosure.

FIG. 27 shows a diagram illustrating a configuration of a charger embedded in a middle section with additional power outlets and a wired ball USB splitter, according to an embodiment of the present disclosure.

Referring to FIG. 27, three electronic devices may simultaneously be charged. A first electronic device 901 may wirelessly be charged through a wireless charging pad embedded into a middle section of a sofa. The first electronic device 901 may be placed on a portion of the middle section of the sofa that has a wireless charging pad embedded thereunder. For example, a wireless charging pad may be embedded into a locking mechanism, which can be inserted into a pre-bored hole. The locking mechanism may be hidden from view when the middle section of the sofa is in the closed position. That is, the pre-bored hole may be located on an inner surface of a door and/or flap such that the side of the door and/or flap opposite the locking mechanism provides a flush surface on which an electronic device 901 can wirelessly be charged.

Additionally, a second electronic device 902 and a third electronic device 903 can simultaneously be charged through the ball charger 803. The second electronic device 902 and the third electronic device 903 can be simultaneously charged while the first electronic device 901 is wirelessly being charged.

Figure 28:
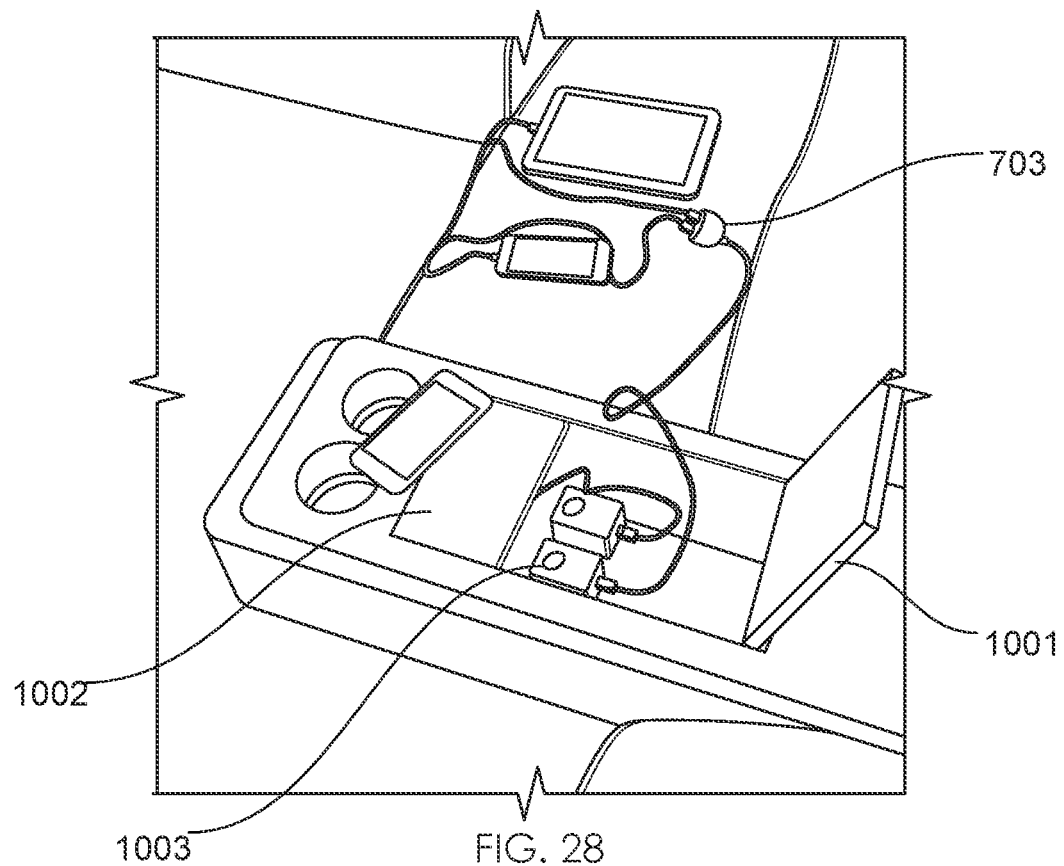
FIG. 28 shows a diagram illustrating an interior configuration of a charger embedded in a middle section with additional power outlets and a wired ball USB splitter, according to an embodiment of the present disclosure.

FIG. 28 shows a diagram illustrating an interior configuration of a charger embedded in a middle section with additional power outlets and a wired ball USB splitter, according to an embodiment of the present disclosure.

The middle section of the sofa may include hidden power outlets 1003 which are accessible by flipping open a small door 1001. The middle section may also include a wireless charger 1002 embedded therein.

Figure 29:
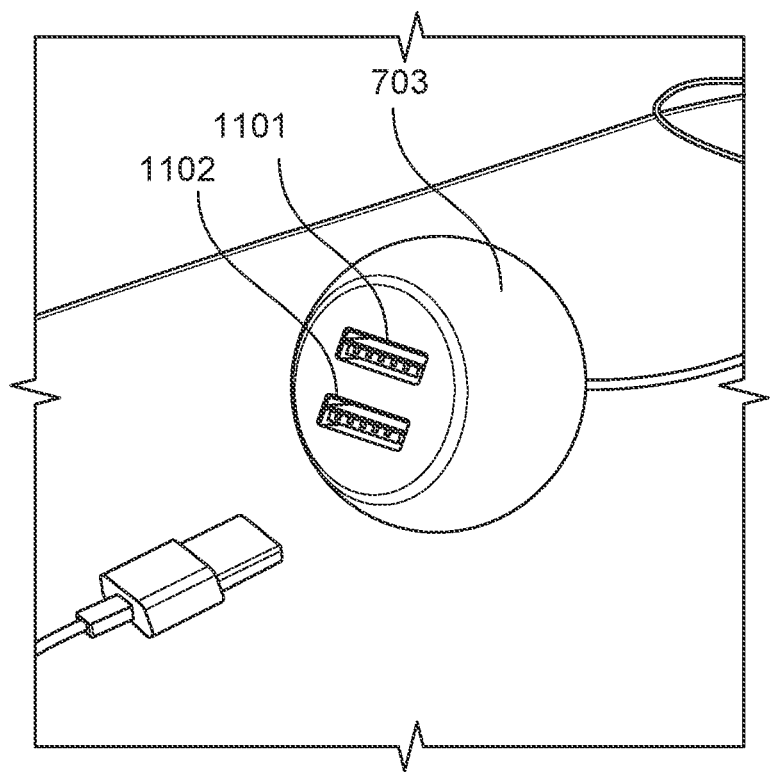
FIG. 29 shows a diagram illustrating a wired ball USB splitter, according to an embodiment of the present disclosure.

FIG. 29 shows a diagram illustrating a wired ball USB splitter, according to an embodiment of the present disclosure.

Referring to FIG. 29, the USB splitter may be a USB ball charger 803 (i.e., a half moon charger) capable of providing different power outputs to a first USB output socket 1101 and a second USB output socket 1102 according to what type of electronic device is plugged into each output socket.

The USB ball charger may include one or more custom integrated circuits (ICs) which may include a large variety of standards and protocols to communicate with many different types of electronic devices. For instance, when a first type of electronic device is connected to the USB output socket 1101, a custom IC may identify the type of electronic device by communicating with an external IC of the first electronic device and determine a first output power for charging. When a second type of electronic device is connected to the second USB output socket 1102, the custom IC may identify the second type of electronic device by communicating with an external IC of the second electronic device and determine a second output power for charging.

Additionally, the custom ICs may prioritize charging. For instance, when a first type of electronic device requires a relatively large power usage for charging when compared to a second type device, then the custom IC may distribute power in a way to ensure that both devices are charged according to their factory specifications. This may mean that the lower power usage device (i.e., the second type device) may first be charged completely and the higher power usage device may be charged after the lower power usage device is finished charging.

Figure 30:
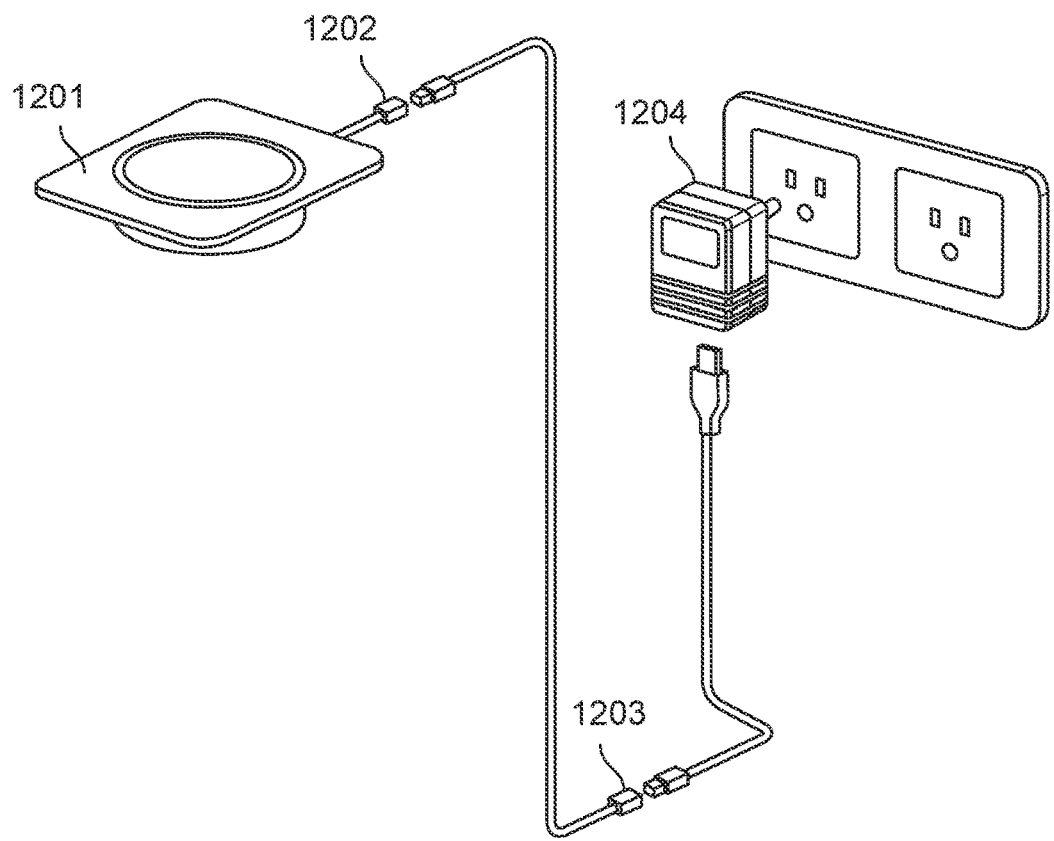
FIG. 30 shows a diagram illustrating a configuration of a wireless charger, according to an embodiment of the present disclosure.

FIG. 30 shows a diagram illustrating a configuration of a wireless charger, according to an embodiment of the present disclosure.

The wireless charger of FIG. 30 includes a charging pad 1201. The charging pad 1201 includes a coil capable of producing an electromagnetic field that extends outward from the charging pad 1201. The coil may be embedded inside the charging pad 1201 so that an electronic device may be positioned in the electromagnetic field by being placed on top of the surface of the charging pad 1201. The charging pad 1201 may be attached to a first cable which connects to a first electrical connector 1202.

The first electrical connector 1202 is connected to a second cable which is connected to a second electrical connector 1203. The second electrical connector 1203 is connected to a third cable which connects to the wall power supply 1204. The first electrical connector 1202 and the second electrical connector 1203 are detachable such that either one may be used to connect or disconnect the charging pad 1201 from the wall power supply 1204. Additionally, the third cable may be detachable from the wall power supply 1204 such that the wall power supply 1204 may be disconnected from the second electrical connector 1203.

In particular, the wall power supply 1204 may include a USB port for the third cable to be connected to. The wall power supply 1204 may connect to a standard United States power supply of 120 volts (V) at 60 hertz (Hz), or may be connected to other power supply voltages and/or frequencies (i.e., alternating current and/or direct current power).

The first electrical connector 1202 and the second electrical connector 1203 are detachable, therefore the wireless charger may be detached from the second cable, the third cable, and the wall power supply 1204. Likewise, the wall power supply 1204 may be detached from the second cable, the first cable, and the wireless charger.

Figure 31:
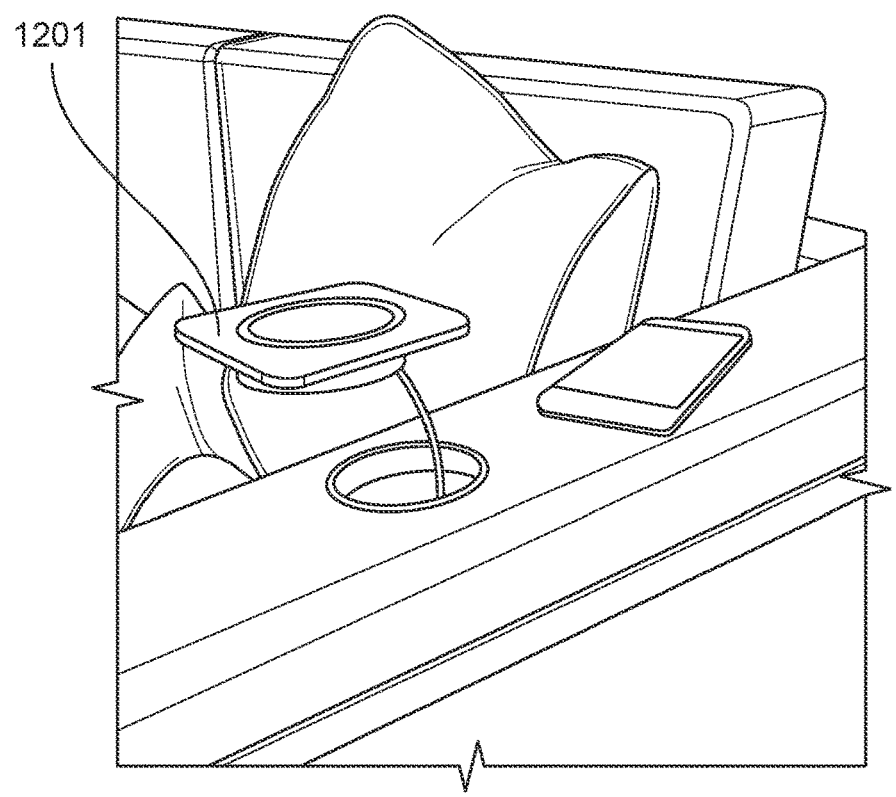
FIG. 31 shows a diagram illustrating a configuration of a wireless charging pad placed in a drink holder of an armrest, according to an embodiment of the present disclosure.

FIG. 31 shows a diagram illustrating a configuration of a wireless charging pad placed in a drink holder of an armrest, according to an embodiment of the present disclosure.

Referring to FIG. 31, the wireless charging pad 1201 may be formed to fit into a cup holder on an armrest of the sofa. Specifically, the bottom side of the wireless charging pad 1201 may be a shaped circularly so as to fit inside of the cup holder on the armrest of the sofa. In this manner, the wireless charging pad 1201 may appear to be attached to the armchair of the sofa because the wireless charging pad 1201 can be fitted to the cup holder. Additionally, the cable which attaches the wireless charging pad 1201 to the first electrical may run through the cup holder to access the interior of the sofa armchair. Therefore, the cable will not be visible when the wireless charger 1201 is placed into the cupholder.

Figure 32:
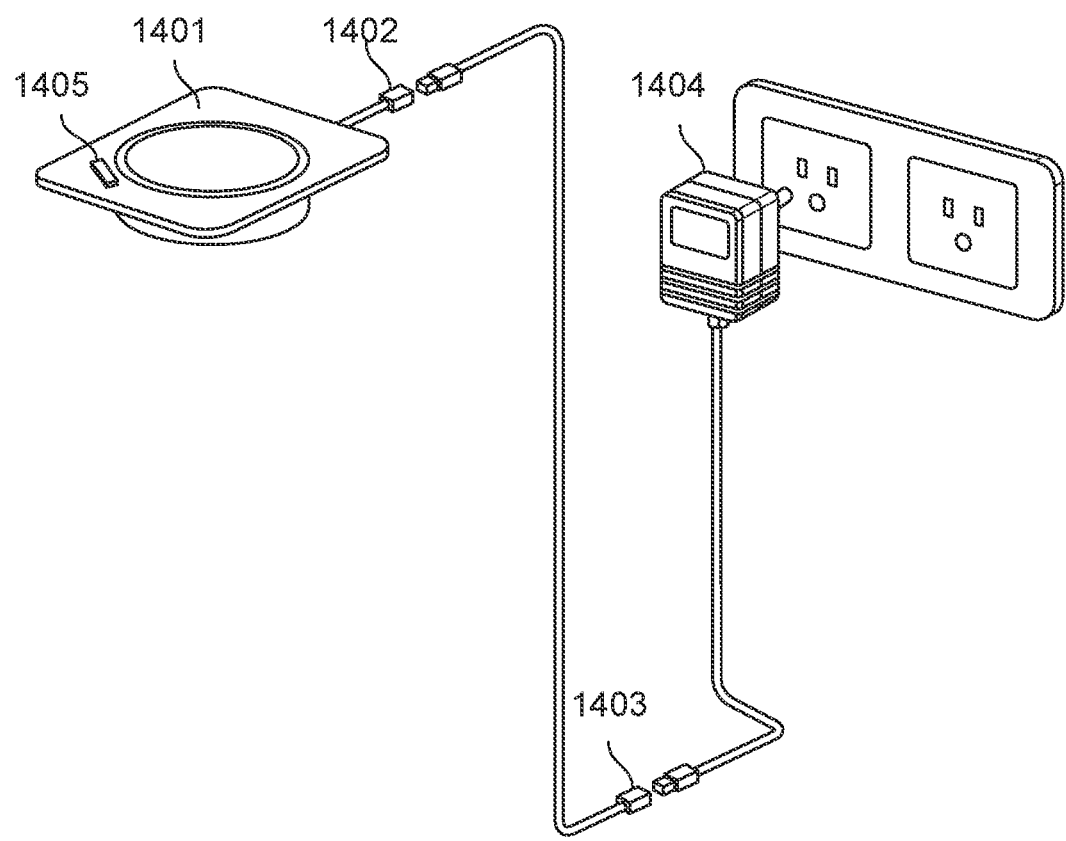
FIG. 32 shows a diagram illustrating a configuration of a wireless charger with a USB port for wired charging, according to an embodiment of the present disclosure.

FIG. 32 shows a diagram illustrating a configuration of a wireless charger with a USB port for wired charging, according to an embodiment of the present disclosure.

Referring to FIG. 32, the wireless charger includes a charging pad 1401. The charging pad 1401 includes a coil capable of producing an electromagnetic field that extends outward from the charging pad 1401. The coil may be embedded inside the charging pad 1401 so that an electronic device may be positioned in the electromagnetic field by being placed on top of the surface of the charging pad 1401.

In addition to including a wireless charger embedded therein, the charging pad 1401 may also include a USB port 1405 positioned on the exterior of the charging pad 1401. This configuration may allow for a user to wirelessly charge a first electronic device on the charging pad 1401 and to simultaneously charge a second electronic device through the USB port 1405.

The charging pad 1401 may be attached to a first cable which connects to a first electrical connector 1402. The first electrical connector 1402 may be connected to a second cable which may be connected to a second electrical connector 1403. The second electrical connector 1403 may be connected to a third cable which connects to the wall power supply 1404. The first electrical connector 1402 and the second electrical connector 1403 may be detachable such that either one may be used to connect or disconnect the charging pad 1401 to the wall power supply 1404.

The wall power supply 1404 may connect to a standard United States power supply of 120 volts (V) at 60 hertz (Hz), or may be connected to other power supply voltages and/or frequencies (i.e., alternating current and/or direct current power).

The first electrical connector 1402 and the second electrical connector 1403 may be detachable, therefore the wireless charger may be detached from the second cable, the third cable, and the wall power supply 1404. Likewise, the wall power supply 1404 may be detached from the second cable, the first cable, and the wireless charger.

Figure 33:
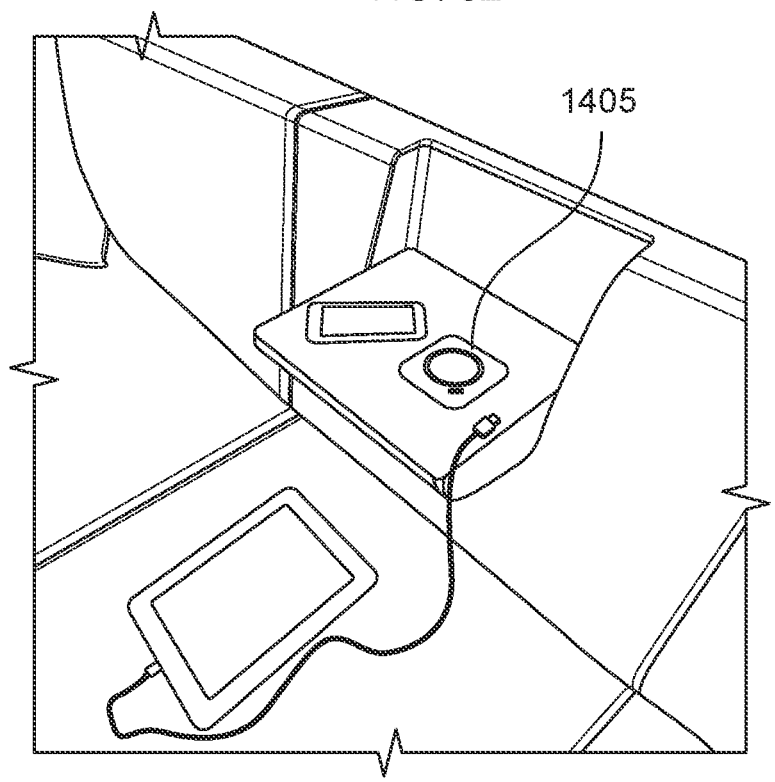
FIG. 33 shows a diagram illustrating a sofa cushion with a wireless charger positioned on a flip-down portion of a cushion, according to an embodiment of the present disclosure.

FIG. 33 shows a diagram illustrating a sofa cushion with a wireless charger positioned on a flip-down portion of a cushion, according to an embodiment of the present disclosure.

Referring to FIG. 33, the sofa cushion may flip down to provide access to the wireless charger. That is, the charging pad 1405 of the wireless charger can be located in a sofa cushion that may be opened from a first position to a second position. The first position may be a regular sofa orientation which a user can sit and/or ordinarily use a cushion. The second position may provide an area for an electronic device to be placed such that a wireless charger embedded in or placed on the flipped down portion of the sofa provides wireless charging to the electronic device.

Figure 34:
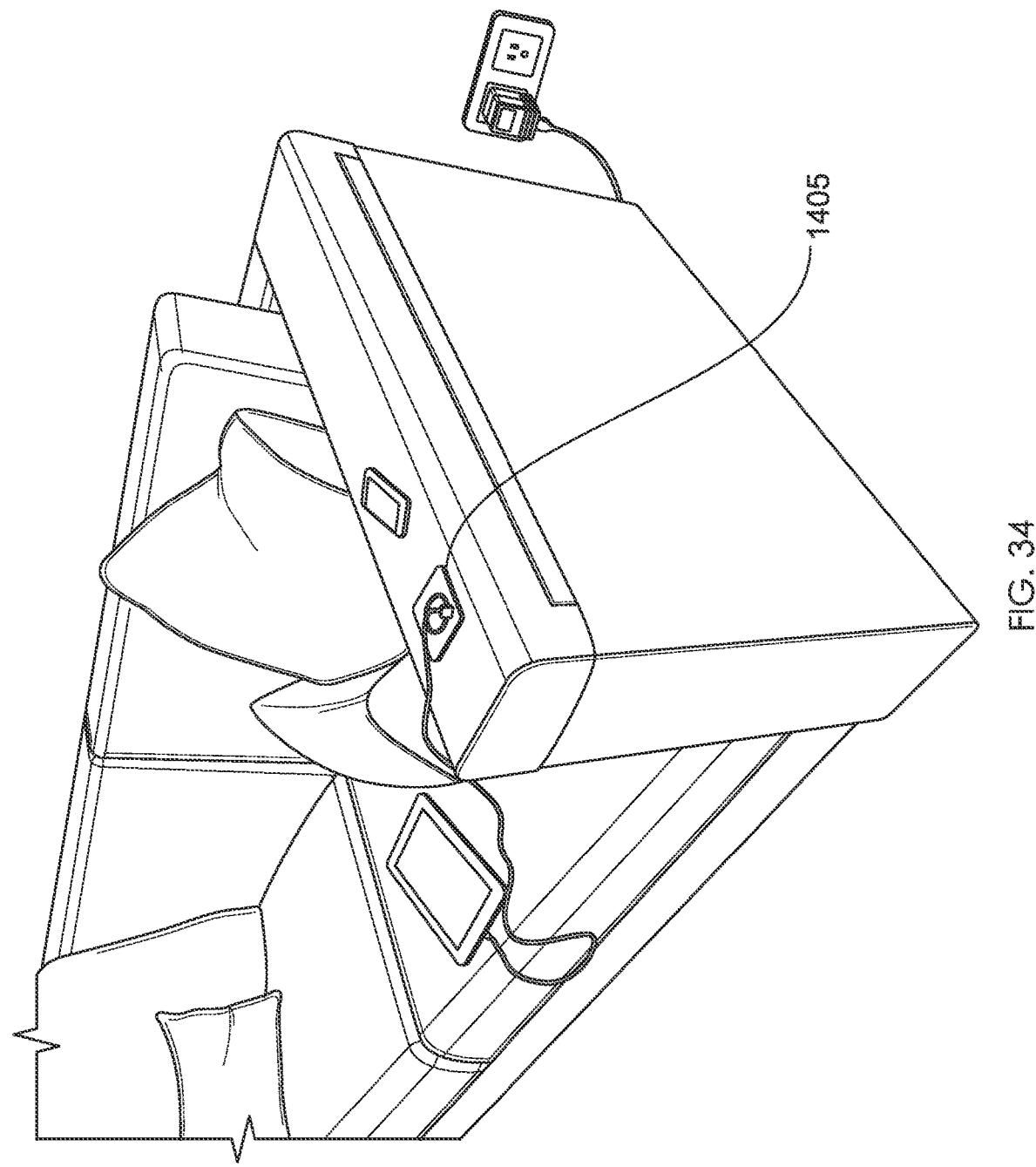
FIG. 34 shows a diagram illustrating a sofa armrest with a wireless charger with a USB port, according to an embodiment of the present disclosure.

FIG. 34 shows a diagram illustrating a sofa armrest with a wireless charger with a USB port, according to an embodiment of the present disclosure.

Referring to FIG. 34, the charging pad 1405 of the wireless charger can be positioned on top of the sofa armrest. The charging pad 1405 can wirelessly charge a first electronic device by placing it near or on top of the charging pad 1405. Additionally, the charging pad 1405 can charge a second electronic device through a USB port located on the surface of the charging pad 1405.

While the disclosure has been shown and described with reference to a certain preferred embodiment thereof, it will be understood by those skilled in the art that various changes in form and details may be made therein without departing from the spirit and scope of the disclosure.

The invention claimed is:

1. A device for wireless charging of at least one external device, the device capable of being fixed to a portion of furniture and comprising:
   a charger configured to transmit electricity via induction;
   a horizontal arm of an angular shelf beneath which the charger is mounted; and
   an angular bracket configured to mount the device to the portion of the furniture by adjusting a spacing between a vertical arm of the angular bracket and a vertical arm of the angular shelf to approximately a width of the portion of the furniture,
   wherein the charger is mounted between the angular bracket and the angular shelf, and
   wherein the angular bracket is slidably mounted in relation to the vertical arm of the angular shelf.

2. The device of claim 1, wherein the angular bracket is equipped with at least one displacement and positioning lock.

3. The device of claim 1, wherein the angular shelf comprises the horizontal arm of the angular shelf and the vertical arm of the angular shelf, and
   wherein the angular bracket comprises a horizontal arm of the angular bracket and the vertical arm of the angular bracket.

4. The device of claim 3, wherein the horizontal arm of the angular shelf is configured to be positioned above the portion of the furniture in a mounting state,
   wherein the vertical arm of the angular shelf is configured to be positioned against a first lateral side of the portion of the furniture in the mounting state, and
   wherein the vertical arm of the angular bracket is configured to be positioned against a second lateral side of the portion of the furniture in the mounting state.

5. The device of claim 3, wherein the angular bracket adheres to an inner surface of the angular surface,
   wherein the vertical arm of the angular shelf is substantially parallel to the vertical arm of the angular bracket, and
   wherein the horizontal arm of the angular shelf is substantially parallel to the horizontal arm of the angular bracket.

6. The device of claim 3, wherein the horizontal arm of the angular bracket adheres horizontally to the horizontal arm of the shelf.

7. The device of claim 1, wherein the angular bracket is configured to slide with respect to the vertical arm of the angular shelf when pressure is applied to a surface of the angular bracket.

8. The device of claim 1, wherein a position of the angular bracket with respect to the angular shelf is set by tightening a locking screw into a socket beneath the angular bracket such that the locking screw is screwed in a direction towards the horizontal arm of the angular shelf and passes through a longitudinal slot of the horizontal arm of the angular bracket.

9. The device of claim 3, wherein the angular bracket is configured to slide based on a manual pressure applied to a single-acting ratchet mechanism positioned between the horizontal arm of the angular shelf and the horizontal arm of the angular bracket.

10. The device of claim 9, wherein the angular bracket is mounted to the horizontal arm of the angular shelf using sliding pins placed in slots of the horizontal arm of the angular bracket.

11. The device of claim 9, wherein a toothed locking bar is embedded in a bottom recess of the horizontal arm of the angular shelf,
    wherein a latch is embedded in the horizontal arm of the bracket and configured to lock with the toothed locking bar, and
    wherein the latch includes a pressure area configured to unlock the latch from the toothed locking bar when pressure is applied to the pressure area.

12. The device of claim 1, wherein the angular bracket is equipped with a motor configured to adjust a position of the angular bracket with respect to the vertical arm of the angular shelf.

13. The device of claim 11, wherein the motor is connected through a gear with a first end of a bolt that is attached to a lower surface of the horizontal arm of the angular shelf, and
    wherein a second end of the bolt is embedded in a yoke that is attached to a horizontal arm of the angular bracket.

14. The device according to the claim 1, wherein the horizontal arm of the angular shelf includes handles in the form of holes or containers.

15. The device according to the claim 1, wherein the angular shelf has a locator system configured to automatically adjust a position of the charger in relation to one or more devices that receive electricity.

16. The device according to the claim 1, wherein the angular shelf has a locator system configured to automatically adjust a position of the charger in relation to one or more devices that receive electricity.

17. The device according to the claim 1, wherein the device further includes a rechargeable battery configured to provide electricity to the charger.

18. The device according to the claim 1, wherein the device further includes a universal serial bus (USB) laterally positioned below the horizontal arm of the angular shelf.

19. A device for wireless charging at least one external device, the device capable of being fixed to a portion of furniture and comprising:
- a charger configured to transmit electricity via induction; and
- a horizontal arm of an angular shelf beneath which the charger is mounted,
- wherein the angular shelf includes a locator system configured to automatically adjust a position of the charger in relation to the at least one external device to receive electricity.

20. A device for wireless charging at least one external device, the device capable of being fixed to a portion of furniture and comprising:
- a charger configured to transmit electricity via induction;
- a universal serial bus (USB) port configured to transmit electricity via a wire;
- a horizontal arm of an angular shelf beneath which the charger is centrally mounted and the USB port is laterally mounted;
- an angular bracket configured to mount the device to the portion of the furniture by adjusting a spacing in between a vertical arm of the angular bracket and a vertical arm of the angular shelf to approximately a width of the portion of the furniture; and
- a rechargeable battery configured to provide power to the charger and the USB port,
- wherein the charger is mounted between the angular bracket and the angular shelf, and
- wherein the angular bracket is slidably mounted in relation to the vertical arm of the angular shelf.

* * * * *